United States Patent
Lee

(10) Patent No.: US 10,514,863 B2
(45) Date of Patent: Dec. 24, 2019

(54) MEMORY SYSTEM AND OPERATION METHOD FOR THE SAME

(71) Applicant: SK hynix Inc., Gyeonggi-do (KR)

(72) Inventor: Joo-Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 152 days.

(21) Appl. No.: 15/473,866

(22) Filed: Mar. 30, 2017

(65) Prior Publication Data

US 2018/0039447 A1 Feb. 8, 2018

(30) Foreign Application Priority Data

Aug. 2, 2016 (KR) .................. 10-2016-0098528

(51) Int. Cl.
| | |
|---|---|
| G06F 3/06 | (2006.01) |
| G06F 11/10 | (2006.01) |
| G06F 12/02 | (2006.01) |
| G06F 12/0802 | (2016.01) |
| G06F 12/0866 | (2016.01) |
| G06F 13/16 | (2006.01) |

(52) U.S. Cl.
CPC .......... *G06F 3/0659* (2013.01); *G06F 3/061* (2013.01); *G06F 3/0652* (2013.01); *G06F 3/0656* (2013.01); *G06F 3/0679* (2013.01); *G06F 11/1064* (2013.01); *G06F 12/0246* (2013.01); *G06F 12/0802* (2013.01); *G06F 12/0866* (2013.01); *G06F 13/1668* (2013.01); G06F 2212/222 (2013.01); G06F 2212/313 (2013.01); G06F 2212/60 (2013.01); G06F 2212/7203 (2013.01)

(58) Field of Classification Search
CPC ...... G06F 3/061; G06F 3/0652; G06F 3/0656; G06F 3/0659; G06F 3/069; G06F 11/1064; G06F 12/0246; G06F 12/0802; G06F 12/0866; G06F 13/1668; G06F 2212/60; G06F 2212/222; G06F 2212/313; G06F 2212/7203
See application file for complete search history.

(56) References Cited

U.S. PATENT DOCUMENTS

| | | | |
|---|---|---|---|
| 7,353,326 B2 | 4/2008 | Cho et al. | |
| 2012/0159072 A1* | 6/2012 | Hida | ................... G06F 12/0862 711/119 |

(Continued)

*Primary Examiner* — Aracelis Ruiz
(74) *Attorney, Agent, or Firm* — IP & T Group LLP

(57) ABSTRACT

A memory system includes: a non-volatile memory device; a host controller suitable for generating a cache read command for controlling a cache read operation of the non-volatile memory device and at least one other command for controlling at least one other operation of the non-volatile memory device excluding the cache read operation in response to a request received from a host; and a memory controller suitable for controlling an operation of the non-volatile memory device in response to the cache read command and the at least one other command that are inputted from the host controller. The memory controller suitable for checking out the operation of the non-volatile memory device corresponding to a command that is inputted next to the input of the cache read command, and adding a read operation command including a read preparation command or a read end command next to the cache read command.

19 Claims, 13 Drawing Sheets

(56) References Cited

U.S. PATENT DOCUMENTS

2013/0135934 A1* 5/2013 Kim .................... G11C 11/5621
                                                                              365/185.18
2014/0101519 A1* 4/2014 Lee ..................... G06F 11/1068
                                                                               714/773

* cited by examiner

MEMORY SYSTEM AND OPERATION METHOD FOR THE SAME

CROSS-REFERENCE TO RELATED APPLICATIONS

The present application claims priority of Korean Patent Application No. 10-2016-0098528 filed on Aug. 2, 2016, which is incorporated herein by reference in its entirety.

BACKGROUND

1. Field

Exemplary embodiments of the present invention relate to a semiconductor designing technology, and more particularly, to a method for operating a memory system.

2. Description of the Related Art

The computer environment paradigm has changed to ubiquitous computing systems that can be used anytime and anywhere. Due to this, use of portable electronic devices such as mobile phones, digital cameras, and notebook computers has rapidly increased. These portable electronic devices generally use a memory system having memory devices for storing data. A memory system may be used as a main memory device or an auxiliary memory device of a portable electronic device.

Memory systems using memory devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Embodiments of the present invention are directed to an improved memory system that may efficiently perform a sequential read operation.

In accordance with an embodiment of the present invention, a memory system includes: a non-volatile memory device; a host controller suitable for generating a cache read command for controlling a cache read operation of the non-volatile memory device and at least one other command for controlling at least one other operation of the non-volatile memory device excluding the cache read operation in response to a request received from a host; and a memory controller suitable for controlling an operation of the non-volatile memory device in response to the cache read command and the at least one other command that are inputted from the host controller. The memory controller suitable for checking out the operation of the non-volatile memory device corresponding to a command that is inputted next to the input of the cache read command, and adding a read operation command including a read preparation command or a read end command next to the cache read command.

When one or more cache read commands are consecutively inputted and then the at least one other command is inputted, the memory controller may add the read end command between the consecutively inputted cache read commands and the at least one other command. When one or more cache read commands are consecutively inputted and then the host controller is informed that the cache read operation of the non-volatile memory device is finished, the memory controller may add the read end command right behind a lastly inputted cache read command. When at least one other command is inputted consecutively and then the cache read command is inputted, the memory controller may add the read preparation command between the at least one other command that are inputted consecutively and the cache read command.

The memory controller may include: a command queue suitable for storing a maximal number of Ni commands (where N is an integer equal to or greater than 3). When the at least one other command is inputted to the command queue from the host controller and a command stored in the command queue right before the at least one other command is the cache read command, the memory controller may add the read end command between the at least one other command and the cache read command. When the cache read command is inputted from the host controller and stored in the command queue and then the host controller is informed that the cache read operation of the non-volatile memory device is finished, the memory controller may add the read end command right behind the cache read command that is stored last in the command queue. When the cache read command is inputted from the host controller to the command queue and a command stored in the command queue right before the cache read command is the at least one other command, the memory controller may add the read preparation command between the cache read command and the at least one other command.

The memory system may further include: an Error Checking and Correction (ECC) unit suitable for checking out whether the cache read operation is succeeded or not. The host controller may selectively generate a read retry command for controlling a read retry operation of the non-volatile memory device in response to an output signal of the ECC unit.

The memory controller may control the read retry operation of the non-volatile memory device in response to the read retry command that is inputted from the host controller by checking out whether the non-volatile memory device is performing the cache read command or not at a moment when the read retry command is inputted and selectively adding the read end command right before the read retry command.

The memory controller may include: a command queue suitable for storing a maximal number of N commands (where N is an integer equal to or greater than 3). When the read retry command is inputted from the host controller to the command queue and the non-volatile memory device is performing the cache read operation, the memory controller may add the read end command right before the read retry command.

The non-volatile memory device may include: a non-volatile memory cell region; a page buffer suitable for storing data inputted to/outputted from the non-volatile memory cell region; and a cache buffer that is coupled to the page buffer and transfers/receives data to/from the page buffer, and stores data inputted to/outputted from the memory controller.

The non-volatile memory device may erase data that are stored in the cache buffer in response to the read preparation command or the read end command transferred from the memory controller.

The non-volatile memory device may erase data that are stored in the page buffer and the cache buffer in response to the read preparation command or the read end command transferred from the memory controller.

The at least one other operation may include one of a program operation of the non-volatile memory device and an erase operation of the non-volatile memory device.

In accordance with another embodiment of the present invention, a method for operating a memory system including a non-volatile memory device may include: generating, by a host controller, a cache read command for controlling a cache read operation of the non-volatile memory device and at least one other command for controlling at least one other operation of the non-volatile memory device excluding the cache read operation in response to a request received from a host; and at least one other command controlling, by a memory controller, an operation of the non-volatile memory device in response to receiving of the cache read command and the other command. The controlling of the operation of the non-volatile memory device may include checking out the operation of the non-volatile memory device corresponding to a command that is inputted next to the input of the cache read command, and adding a read operation command including a read preparation command or a read end command next to the cache read command.

At least one other command controlling of the operation of the non-volatile memory device may include: when one or more cache read commands are consecutively inputted and then the at least one other command is inputted, adding the read end command between the consecutively inputted cache read commands and the at least one other command; when one or more cache read commands are consecutively inputted and then the host controller is informed that the cache read operation of the non-volatile memory device is finished, at least one other operation adding the read end command right behind a lastly inputted cache read command; and when at least one other command is inputted consecutively and then the cache read command is inputted, adding the read preparation command between the at least one other command that are inputted consecutively and the cache read command.

The method may further include: storing the commands, which are generated in the generating of the cache read command for controlling the cache read operation of the non-volatile memory device and the at least one other command for controlling the at least one other operation that is not the cache read operation in response to the request received from the host, in a command queue capable of storing a maximal number of N commands (where N is an integer equal to or greater than 3) in a predetermined sequential order. The controlling of the operation of the non-volatile memory device may include: when the at least one other command is inputted to the command queue and a command stored in the command queue right before the at least one other command is the cache read command, adding the read end command between the at least one other command and the cache read command; when the cache read command is stored in the command queue and then an end of the cache read operation of the non-volatile memory device is confirmed, adding the read end command right behind the cache read command that is stored last in the command queue; and when the cache read command is inputted to the command queue and a command stored in the command queue right before the cache read command is the at least one other command, adding the read preparation command between the cache read command and the at least one other command.

The method may further include: checking out whether the cache read operation of the non-volatile memory device is succeeded or not so as to produce a checking result. The generating of the cache read command and the other command may include generating a read retry command for controlling a read retry operation of the non-volatile memory device in response to the checking result.

The method may further include: receiving the read retry command and controlling the read retry operation of the non-volatile memory device by checking out whether the non-volatile memory device is performing the cache read command or not at a moment when the read retry command is inputted and selectively adding the read end command right before the read retry command.

The method may further include: sequentially storing the commands, which are generated in the generating of the cache read command for controlling the cache read operation of the non-volatile memory device and the at least one other command for controlling the at least one other operation that is not the cache read operation response to the request received from the host, in a command queue capable of storing a maximal number of N commands (where N is an integer equal to or greater than 3) in a predetermined sequential order. In the receiving of the read retry command and the controlling of the read retry operation of the non-volatile memory device by checking out whether the non-volatile memory device is performing the cache read command or not at a moment when the read retry command is inputted and selectively adding the read end command right before the read retry command, when the read retry command is inputted to the command queue and the non-volatile memory device is performing the cache read operation, the read end command is added right before the read retry command.

The non-volatile memory device may include: a non-volatile memory cell region; a page buffer suitable for storing data inputted to/outputted from the non-volatile memory cell region; and a cache buffer that is coupled to the page buffer and transfers/receives data to/from the page buffer, and stores data inputted to/outputted from an exterior of the non-volatile memory device. The method may further include: erasing the data stored in the cache buffer of the non-volatile memory device in response to the read preparation command or the read end command.

The non-volatile memory device may include: a non-volatile memory cell region; a page buffer suitable for storing data inputted to/outputted from the non-volatile memory cell region; and a cache buffer that is coupled to the page buffer and transfers/receives data to/from the page buffer, and stores data inputted to/outputted from an exterior of the non-volatile memory device. The method may further include: erasing the data stored in the page buffer and the cache buffer of the non-volatile memory device in response to the read preparation command or the read end command.

The at least one other operation may include one of a program operation of the non-volatile memory device and an erase operation of the non-volatile memory device.

BRIEF DESCRIPTION OF THE DRAWINGS

These and other features and advantages of the present invention of the present invention will be described in reference to the accompanying drawings, wherein.

DETAILED DESCRIPTION

Figure 1:
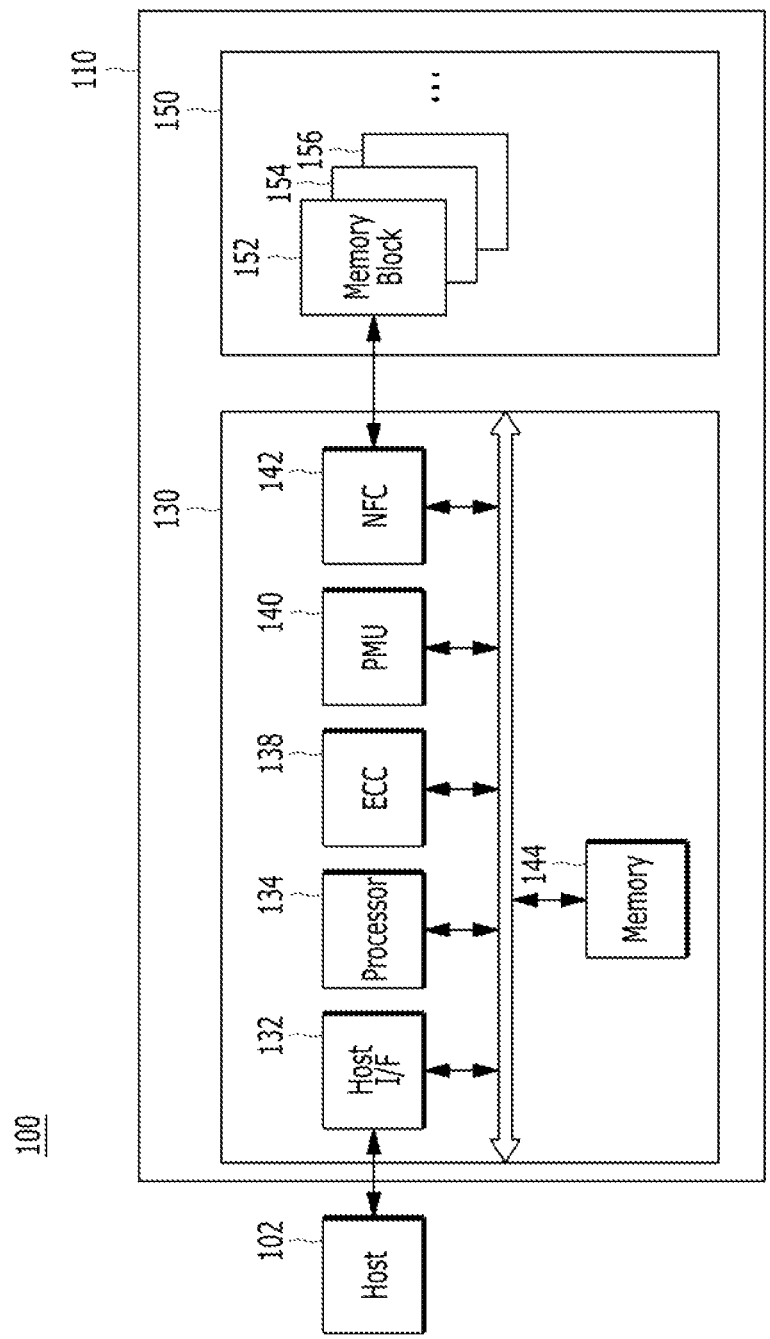
FIG. 1 is a diagram illustrating a data processing system including a memory system, according to an embodiment of the present invention.

Although, various embodiments are described below in more detail with reference to the accompanying drawings, we note that the present invention may, however, be embodied in different forms and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third" and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and some instances, proportions may have been exaggerated in order to clearly illustrate various features of the embodiments.

It will be further understood that when an element is referred to as being "connected to" or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 illustrates a data processing system 100 including a memory system, according to an embodiment of the present invention.

Referring to FIG. 1, the data processing system 100 may include a host 102 and a memory system 110.

The host 102 may include, for example, a portable electronic device such as a mobile phone, an MP3 player and a laptop computer or an electronic device such as a desktop computer, a game player, a television (TV) and a projector.

The memory system 110 may operate in response to a request from the host 102. For example, the memory system 110 may store data to be accessed by the host 102. The memory system 110 may be used as a main memory or an auxiliary memory of the host 102. The memory system 110 may be implemented with any one of various storage devices, according to the protocol of a host interface to be coupled electrically with the host 102. The memory system 110 may be implemented with any one of various storage devices such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices forming the memory system 110 may be implemented with a volatile memory device, such as a dynamic random access memory (DRAM) and a static random access memory (SRAM) or a nonvolatile memory device, such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM) and a flash memory.

The memory system 110 may include a memory device 150 and a controller 130. The memory device 150 stores data to be accessed by the host 102, and the controller 130 controls data exchange between the memory device 150 and the host 102. That is, under the control of the controller 130, data received from the host 102 may be stored in the memory device 150.

The controller 130 and the memory device 150 may be integrated into one semiconductor device. For instance, the controller 130 and the memory device 150 may be integrated into one semiconductor device to form a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device to form a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card, a mini-SD, a micro-SD, an SDHC, and a universal flash storage (UFS) device.

For another instance, the memory system 110 may be configured as a part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage for a data center, a device capable of transmitting and receiving information under a wireless environment, one of various electronic devices for a home network, one of various electronic devices for a computer network, one of various electronic devices for a telematics network, an RFID device, or one of various component elements for a computing system.

The memory device 150 may retain stored data even when power is blocked, store the data provided from the host 102 during a write operation, and provide stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of a word line (WL) are electrically coupled. The memory cells may be single bit cells or multi-bit cells. The memory cells may be arranged in a two or three dimensional stacked structure. The memory device 150 may be a nonvolatile memory device, for example, a flash memory. The flash memory may have a three-dimensional (3D) stack structure. The structure of the memory device 150 and the three-dimensional (3D) stack structure of the memory device 150 will be described later in detail with reference to FIGS. 2 to 4.

The controller 130 of the memory system 110 may control the memory device 150 in response to a request from the host 102. The controller 130 may provide the data read from the memory device 150, to the host 102, and store the data provided from the host 102 into the memory device 150. To this end, the controller 130 may control overall operations of the memory device 150, such as read, write, program, and erase operations.

For example, the controller 130 may include a host interface (I/F) unit 132, a processor 134, an error correction code (ECC) unit 138, a power management unit (PMU) 140, a NAND flash controller (NFC) 142, and a memory 144.

The host interface unit 132 may process commands and data provided from the host 102, and may communicate with the host 102 through at least one of various interface protocols such as universal serial bus (USB), multimedia card (MMC), peripheral component interconnect express (PCI-e), serial attached SCSI (SAS), serial advanced technology attachment (SATA), parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102, The NFC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150 such as read, write, program and erase operations, the memory 144 may store data used by the controller 130 and the memory device 150.

The memory 144 may be implemented with volatile memory such as a static random access memory (SRAM) or a dynamic random access memory (DRAM). As described above, the memory 144 may store data used by the host 102 and the memory device 150 for the read and write operations. For the storage of the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorate the utilization efficiency of the memory device 150 having a 3D stack structure and the reliability of the memory system 100, and thus reliable bad block management is required.

Figure 2:
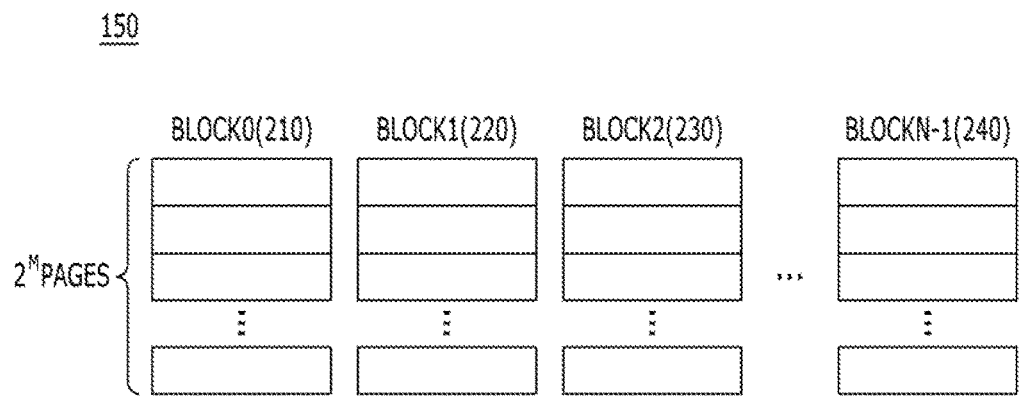
FIG. 2 is a diagram illustrating an exemplary configuration of a memory device employed in the memory system of FIG. 1.

FIG. 2 is a diagram illustrating the memory device 150 shown in FIG. 1.

Referring to FIG. 2, the memory device 150 may include a plurality of memory blocks. For example, the memory device 150 may include a zeroth memory block (BLOCK0) 210, a first memory block (BLOCK1) 220, a second memory block (BLOCK2) 230 and an N-1$^{th}$ memory block (BLOCKN-1) 240. Each of the memory blocks 210 to 240 may include a plurality of pages, for example, 2$^M$ number of pages (2$^M$ PAGES). Each of the pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the memory blocks 210 to 240 may store the data provided from the host 102 during a write operation, and provide the stored data to the host 102 during a read operation.

Figure 3:
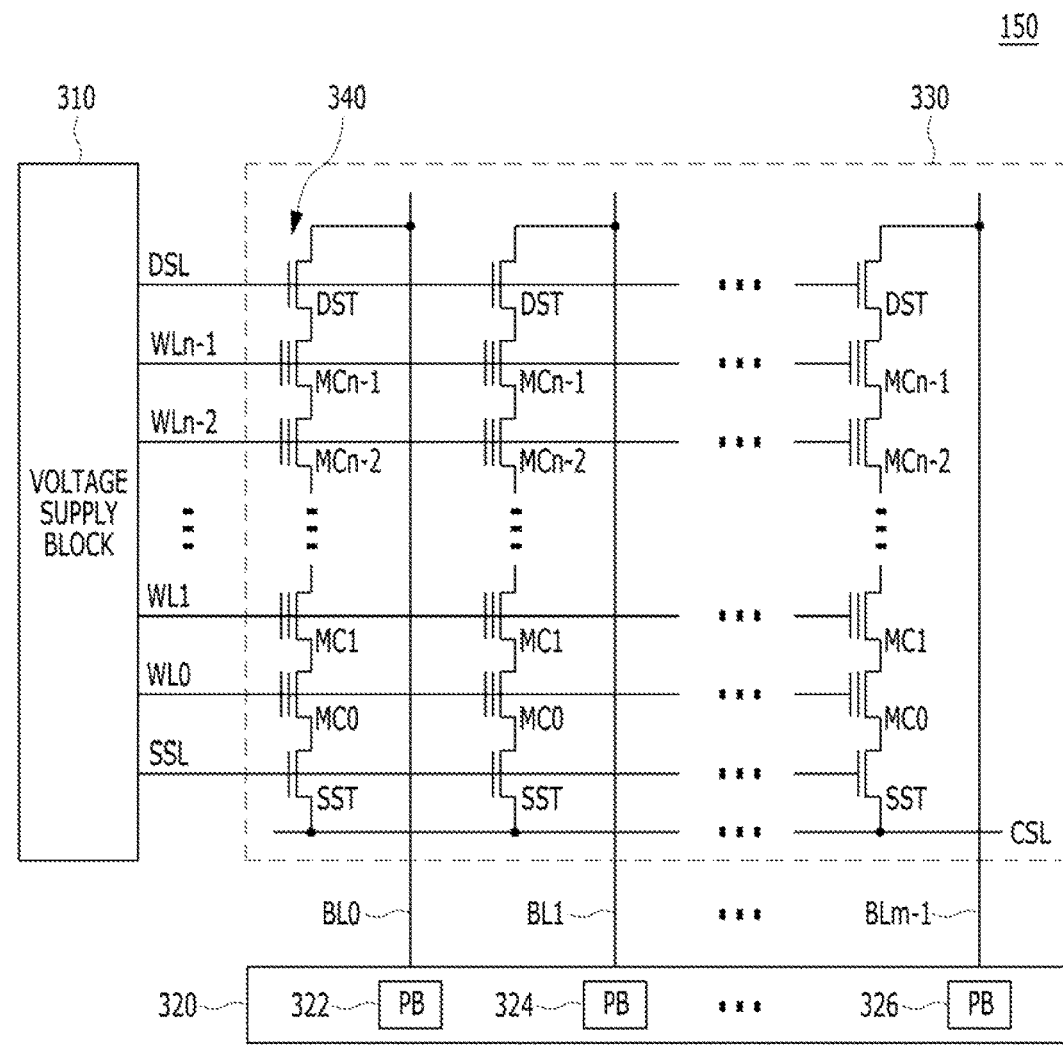
FIG. 3 is a diagram illustrating a memory block in a memory device, according to an embodiment of the present invention.

FIG. 3 is a diagram illustrating a memory device 150 including the memory block shown in FIG. 2. For example, FIG. 3 shows a detailed configuration that the memory device 150 may include a single memory block 330 and circuits related thereto 310 and 320.

Referring to FIG. 3, the memory block 330 may include a plurality of cell strings 340 which are electrically coupled to bit lines BL0 to BLm-1, respectively. The cell string 340 of each column may include at least one drain select transistor DST and at least one source select transistor SST. A plurality of memory cell transistors MC0 to MCn-1 may be electrically coupled in series between the select transistors SST and DST. The respective memory cells MC0 to MCn-1 may be configured by multi-level cells (MLC) each of which stores data information of a plurality of bits. The cell strings 340 may be electrically coupled to the corresponding bit lines BL0 to BLm-1, respectively. For reference, in FIG. 3, 'DSC' denotes a drain select line (i.e., a string select line), 'SSL' denotes a source select line (i.e., a ground select line), and 'CSL' denotes a common source line.

While FIG. 3 shows, as an example, the memory block 330 which is configured by NAND flash memory cells, it is to be noted that the memory block 330 of the memory device 300 according to an exemplary embodiment of the present invention is not limited to NAND flash memory and may be realized by NOR flash memory, hybrid flash memory in which at least two kinds of memory cells are combined, or one-NAND flash memory in which a controller is built in a memory chip. The operational characteristics of a semiconductor device may be applied to not only a flash memory device in which a charge storing layer is configured by conductive floating gates but also a charge trap flash (CTF) in which a charge storing layer is configured by a dielectric layer.

A voltage supply block 310 of the memory device 300 may provide word line voltages, for example, a program voltage, a read voltage and a pass voltage, to be supplied to respective word lines according to an operation mode and voltages to be supplied to bulks, for example, well regions, where the memory cells are formed. The voltage supply block 310 may perform a voltage generating operation under the control of a control circuit (not shown), The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 300 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver which drives bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers (PBs) 322, 324 and 326 respectively corresponding to columns (or bit lines) or pairs of columns (or pairs of bit lines), and a plurality of latches (not shown) may be included in each of the page buffers 322, 324 and 326.

The memory device 150 may be realized as a 2-dimensional or 3-dimensional memory device. For example, as shown in FIG. 4, in the case where the memory device 150 is realized as a 3-dimensional nonvolatile memory device, the memory device 150 may include a plurality of memory blocks BLK0 to BLKN-1.

Figure 4:
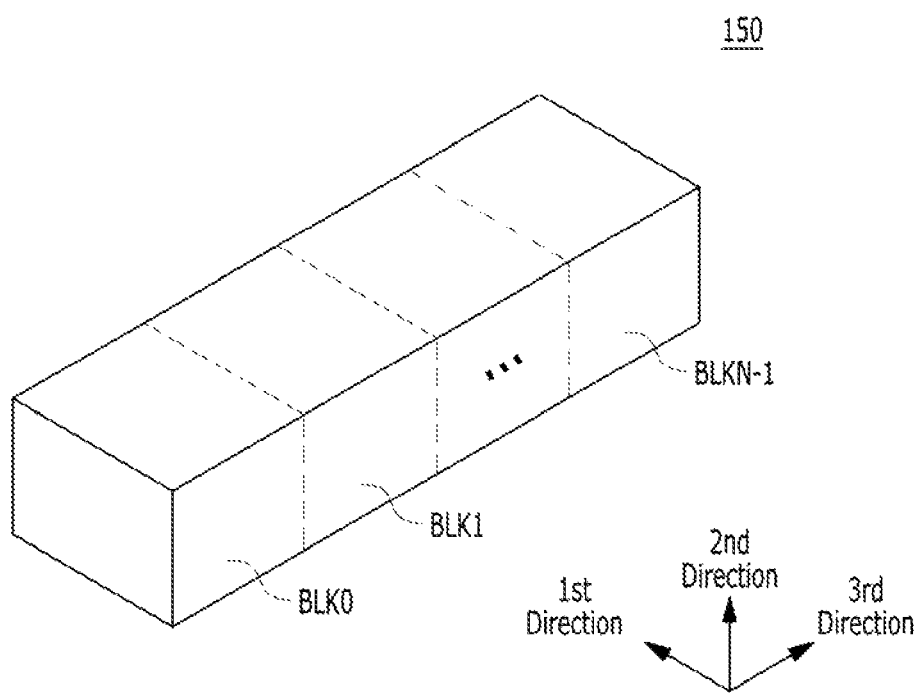
FIG. 4 is a diagram illustrating an exemplary configuration of a memory device, according to an embodiment of the present invention.

FIG. 4 is a diagram illustrating the memory blocks of the memory device 150 shown in FIG. 3, and the memory blocks BLK0 to BLKN-1 may be realized as a 3-dimensional structure (or a vertical structure). For example, the respective memory blocks BLK0 to BLKN-1 may be realized as a 3-dimensional structure by including a structure which extends in first to third directions (for example, the x-axis direction, the y-axis direction and the z-axis direction).

The respective memory blocks BLK0 to BLKN-1 may include a plurality of NAND strings extending in the second direction. The plurality of NAND strings may be provided in the first direction and the third direction. Each NAND string may be electrically coupled to a bit line, at least one drain select line, at least one source select line, a plurality of word lines, at least one dummy word line, and a common source line. Namely, the respective memory blocks BLK0 to BLKN-1 may be electrically coupled to a plurality of bit lines, a plurality of drain select lines, a plurality of source select lines, a plurality of word lines, a plurality of dummy word lines, and a plurality of common source lines.

Figure 5:
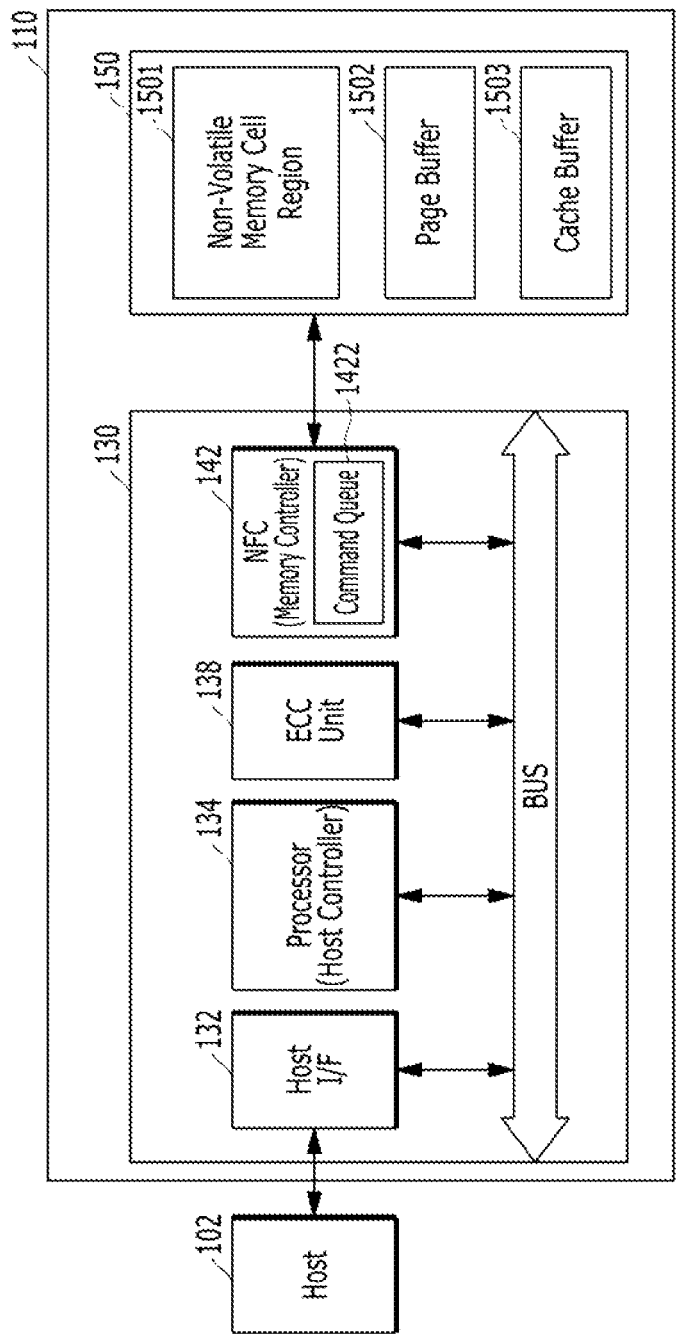
FIG. 5 is a block diagram illustrating a memory system in accordance with an embodiment of the present invention.

FIG. 5 is a block diagram illustrating a memory system in accordance with an embodiment of the present invention.

Referring to FIG. 5, a memory system 110 may include a controller 130 and a non-volatile memory device 150. Although FIG. 5 illustrates an example where the memory system 110 includes one non-volatile memory device 150, the memory system 110 may include a plurality of non-volatile memory devices. Also, although not shown in FIG. 5, the controller 130 may also include the memory unit 144 and the power management unit 140 of the embodiment of FIG. 1. In the embodiment of FIG. 5, the memory unit 144 and the power management unit 140 are omitted for the sake of convenience in description.

The memory system 110 shown in FIG. 5 may include the controller 130 operatively coupled to the non-volatile memory device 150. The controller 130 may also include a host interface (I/F) unit 132, a processor unit 134, an Error Checking and Correction (also referred to as an Error Correction Code) (ECC) unit 138, and a NAND Flash Controller (NFC) unit 142. The NFC unit 142 may include a command queue 1422. The non-volatile memory device 150 may include a non-volatile memory cell region 1501, a page buffer 1502, and a cache buffer 1503.

Herein, the processor unit 134 may be a constituent element that controls the general operation of the memory system 110, as described earlier with reference to FIG. 1. In short, the processor unit 134 may generate a plurality of commands for controlling the operation of the non-volatile memory device 150 in response to corresponding requests received from the host 102.

The NFC unit 142 may be a constituent element for the interface between the controller 130 and the non-volatile memory device 150 in order for the controller 130 to control the non-volatile memory device 150, as also described earlier with reference to FIG. 1. In other words, the NFC unit 142 may directly control the operation of the non-volatile memory device 150 in response to a plurality of commands that are inputted form the processor unit 134.

We note that the NAND Hash Controller (NFC) unit 142 is just an example of a memory controller when the non-volatile memory device 150 includes a NAND flash memory. However, it is noted that any suitable memory controller that can control the operation of the non-volatile memory device 150 in response to a plurality of commands that are generated by the processor unit 134 may be employed. Hence, hereinafter, the terms the host controller 134' is used to represent the processor unit 134, and the term 'the memory controller 142' is used to represent the NFC unit 142.

The processor unit 134 may also be referred to hereinafter as 'a host controller 134' in a sense that the processor unit 134 generates a plurality of commands for controlling the operation of the non-volatile memory device 150 in response to a request received from the host 102.

Also the term "memory controller 142' is used hereinafter to denote a memory interface with the non-volatile memory device 150 which is not limited to a NAND flash memory. For example, the non-volatile memory device 150 may besides a flash memory may also include a Read Only Memory (ROM), a Mask ROM (MROM), a Programmable ROM (PROM), an Erasable Programmable ROM (EPROM), an Electrically Erasable Programmable ROM (EEPROM), a Ferromagnetic Random Access Memory (FRAM), a Phase-Change Random Access Memory (PRAM), a Magnetic Random Access Memory (MRAM), a Resistive Random Access Memory (RRAM) and so forth.

The command queue 1422 included in the memory controller 142 may be a constituent element for storing a plurality of commands inputted from the host controller 134. The number of commands stored in the command queue 1422 may be equal to a predetermined number. In short, when a plurality of commands are inputted from the host controller 134, the memory controller 142 may store the commands in the command queue 1422 inside therein and then transfer the commands to the non-volatile memory device 150 in a predetermined sequential order so as to control the operation of the non-volatile memory device 150.

In an embodiment, the non-volatile memory cell region 1501 included in the non-volatile memory device 150 may include a plurality of NAND flash memory cells. However, it is noted, that in other embodiments, the non-volatile memory cell region 1501 may include other type non-volatile memory cells, which is also described above with reference to FIG. 3. In an embodiment, the non-volatile memory cell region 1501 may include more than one type non-volatile memory cells, for example, the non-volatile memory cell region 1501 may include a plurality of NAND flash memory cells plus a plurality of at least one other type of non-volatile memory cells. The memory cells may be organized in any suitable architecture including the one of FIG. 3.

The page buffer 1502 included in the non-volatile memory device 150 may be a constituent element that corresponds to the page buffers PB 322, 324 and 326 of FIG. 3. In other words, the page buffer 1502 may be a constituent element for temporarily storing of the data that are inputted to or outputted from the non-volatile memory cell region 1501.

The cache buffer 1503 included in the non-volatile memory device 150 may be a constituent element for supporting a cache read operation of the non-volatile memory device 150, and the cache buffer 1503 may also be a constituent element for temporarily storing the data that are inputted to/outputted from the non-volatile memory device 150. In short, the cache buffer 1503 may be coupled to the page buffer 1502 to exchange data with the page buffer 1502 and may store the data inputted to or outputted from the memory controller 142.

For example, a data that is read from the non-volatile memory cell region 1501 during a read operation of the non-volatile memory device 150 may be stored in the page buffer 1502, and then transferred from the page buffer 1502 to the cache buffer 1503 and stored in the cache buffer 1503. The data stored in the cache buffer 1503 may be outputted to the memory controller 142. Such a read operation is referred to hereinafter as a cache read operation.

Figure 6:
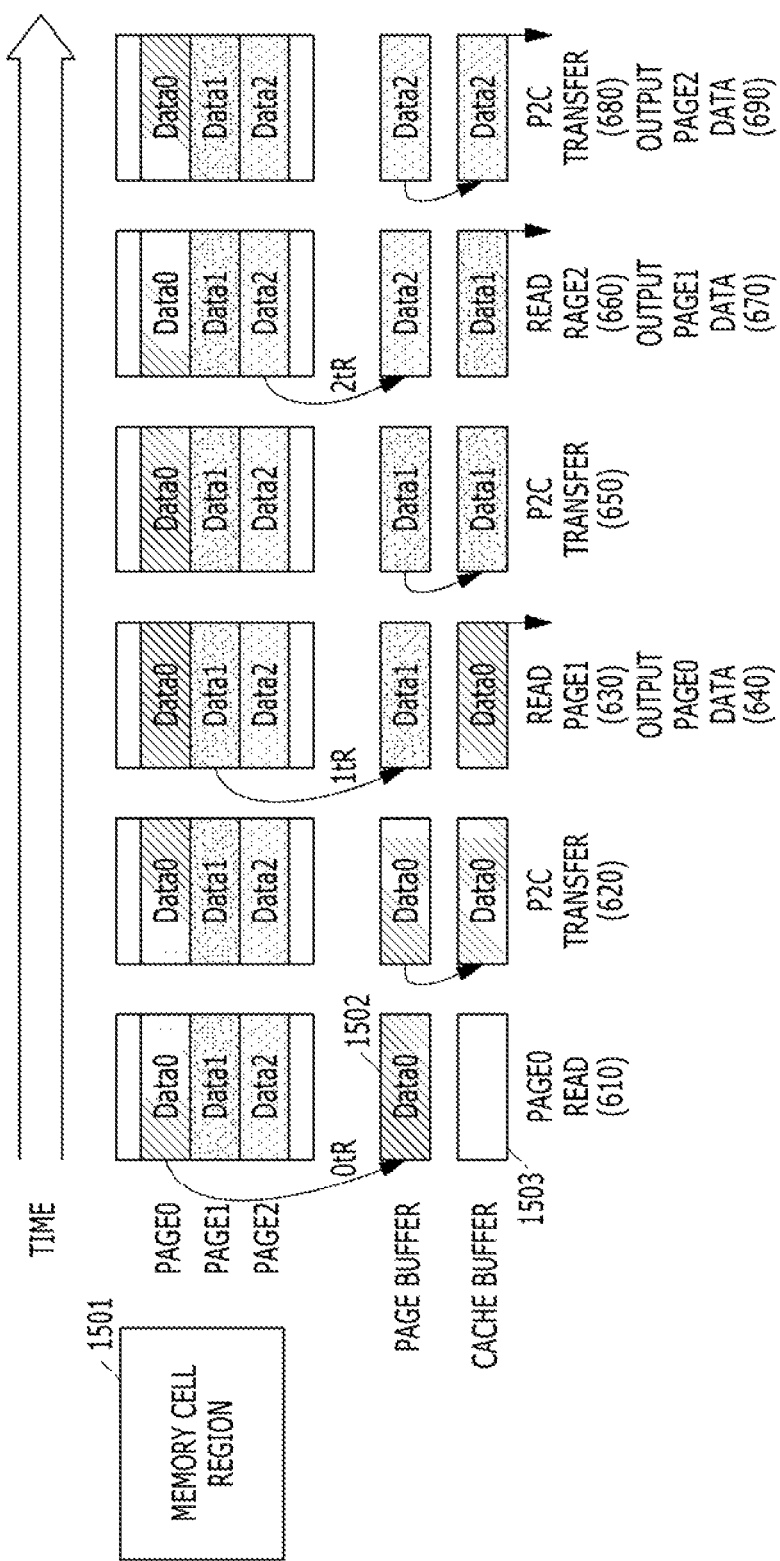
FIG. 6 a diagram illustrating a sequential read operation using a cache read method in a non-volatile memory device included in a memory system, in accordance with the embodiment of the present invention.

FIG. 6 a diagram illustrating a sequential read cache read operation in the non-volatile memory device included in the memory system of FIG. 5, in accordance with an embodiment of the present invention.

For example, FIG. 6 shows how a sequential cache read operation for data of three consecutive pages PAGE0, PAGE1 and PAGE2 is performed in the non-volatile memory device 150 included in the memory system 110.

For example, since data of one page may be read during a one-time read operation performed on the non-volatile memory cell region 1501, the read operation has to be performed three times 0tR, 1tR and 2tR in order to read the data of the three pages PAGE0, PAGE1 and PAGE2. Herein, the cache read operation may be an operation of reading three page data DATA<0:2> that are stored in each of the three pages PAGE0 PAGE1 and PAGE2 through the page buffer 1502, and outputting the three page data DATA<0:2> that are read and stored in the page buffer 1502 to the host 102 through the cache buffer 1503. In short, the cache read operation may be an operation of providing the non-volatile memory device 150 with the page buffer 1502 and the cache buffer 1503 and then operating the page buffer 1502 and the cache buffer 1503 independently. Therefore, during the cache read operation, an operation of reading the three page data DATA<0:2> from the non-volatile memory cell region 1501 to the page buffer 1502 and an operation of outputting the three page data DATA<0:2> from the cache buffer 1503 may be performed simultaneously.

As a result, it may be seen that the cache read operation may be performed in the following order.

First, among the three page data DATA<0:2> stored in the non-volatile memory cell region 1501, a $0^{th}$ data DATA0 that is stored in a $0^{th}$ page PAGE0 may be read into the page buffer 1502 (READ PAGE0 610).

Second, the $0^{th}$ data DATA0 stored in the page buffer 1502 may be copied into the cache buffer 1503 (P2C TRANSFER 620).

Third, among the three pages PAGE0, PAGE1 and PAGE2 stored in the non-volatile memory cell region 1501 the $0^{th}$ data DATA0 stored in the cache buffer 1503 may be outputted to the memory controller 142 (OUTPUT PAGE0 DATA 640), while a first data DATA1 stored in a first page PAGE1 may be read into the page buffer 1502 (READ PAGE1 630) simultaneously.

Fourthly, the first data DATA1 stored in the page buffer 1502 may be copied into the cache buffer 1503 (P2C TRANSFER 650).

Fifthly, among the three page data DATA<0:2> stored in the non-volatile memory cell region 1501, the $1^{st}$ data DATA1 stored in the cache buffer 1503 may be outputted to the memory controller 142 (OUTPUT PAGE1 DATA 670), while a second data DATA2 stored in a second page PAGE2 may be read into the page buffer 1502 (READ PAGE2 660) simultaneously.

Sixthly, the second data DATA2 stored in the page buffer 1502 may be copied into the cache buffer 1503 (P2C TRANSFER 680), and then the second data DATA2 stored in the cache buffer 1503 may be outputted to the memory controller 142 (OUTPUT PAGE2 DATA OUTPUT 690).

In each of the second, third, and fifth operations of the exemplary cache read operation described above, the operation of reading the three page data DATA<0:2> from the non-volatile memory cell region 1501 to the page buffer 1502 and the operation of outputting the three page data DATA<0:2> from the cache buffer 1503 may be performed concurrently.

As described above, when a sequential read operation is performed based on the cache read operation in a non-volatile memory device, the sequential read operation may be performed more quickly and effectively than a normal read operation without using the cache read operation.

Figure 7:
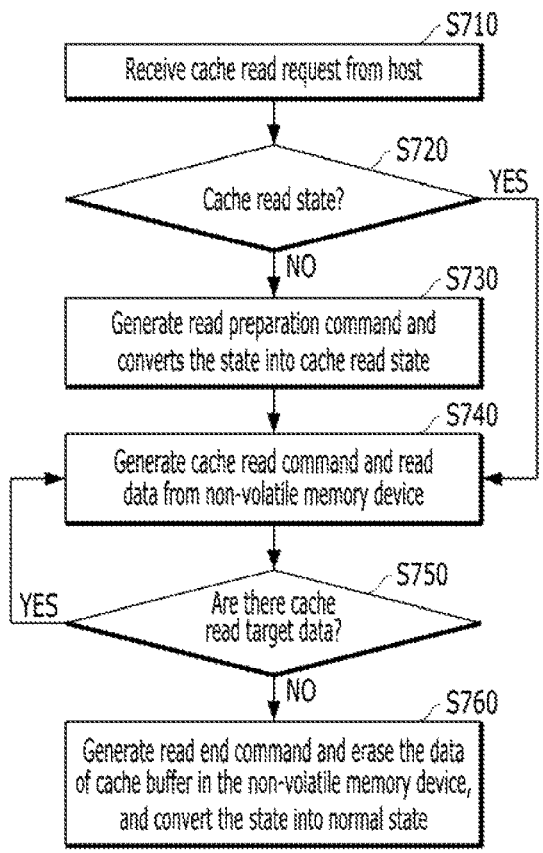
FIG. 7 is a flowchart illustrating a cache read operation of a memory system, in accordance with an embodiment of the present invention.

FIG. 7 is a flowchart illustrating a cache read operation of the memory system of FIG. 5, in accordance with an embodiment of the present invention.

For example, FIG. 7 describes a method how the host controller 134 included in the controller 130 inside the memory system 110 performs the cache read operation in the non-volatile memory device 150, when a cache read request is received from the host 102.

First, when a cache read request is received from the host 102 in step S710, the host controller 134 may check out whether the non-volatile memory device 150 is in a cache read state or not in step S720. In other words, the host controller 134 may check out if a command that is transferred to the non-volatile memory device 150 right before a cache read command in the step S710 is a cache read command or a command for performing one of a at least one other operation.

If the non-volatile memory device 150 is not in a cache read state (NO in step S720), the host controller 134 may generate a read preparation command, erase the data stored in the cache buffer 1503 in the inside of the non-volatile memory device 150, and convert the state of the non-volatile memory device 150 into a cache read state in step S730. In short, the host controller 134 may generate the read preparation command and transfer the generated read preparation command to the non-volatile memory device 150, before it transfers the cache read command corresponding to the cache read request received from the host 102 in the step S710 to the non-volatile memory device 150.

After the state of the non-volatile memory device 150 is converted into the cache read state, the host controller 134 may generate a cache read command corresponding to the cache read request received from the host 102 in the step S710 and read data from the non-volatile memory device 150 in step S740.

If that the non-volatile memory device 150 is in a cache read state (YES in step S720), the host controller 134 may generate a cache read command corresponding to the cache read request received from the host 102 in the step S710 and read data from the non-volatile memory device 150 in step S740.

Subsequently, the host controller 134 may check out whether there are cache read target data in step S750.

If there are cache read target data remaining (YES in step S750), the host controller 134 may generate a cache read command for reading the cache read target data and read data from the non-volatile memory device 150 in step S740.

If there are no cache read target data remaining (NO in step S750), the host controller 134 may generate a read end command, erase the data stored in the cache buffer 1503 in the inside of the non-volatile memory device 150, and convert the state of the non-volatile memory device 150 into a normal state in step S760.

It may be seen in the above that the read preparation command and the read end command are needed to apply the cache read operation method to the non-volatile memory device 150 according to the cache read request received from the host 102 in the step S710, in addition to the cache read command that corresponds to the cache read request received from the host 102.

Herein, the host controller 134 may have to manage the cache read sate and the normal state of the non-volatile memory device 150 separately by using the read preparation command and the read end command. This is for emphasizing that the non-volatile memory device 150 may malfunction when at least one other operation that is not the cache read operation are performed while the cache read operation is being performed in the non-volatile memory device 150, or when another operation is being performed in the non-volatile memory device 150 other than the cache read operation.

Also, whether the non-volatile memory device 150 is in a cache read state or a normal state is detected in order to decide the operation state of the non-volatile memory device 150 inside of the host controller 134. In other words, the setting value inside the host controller 134 may be different according to whether the non-volatile memory device 150 is in a cache read state or a normal state, and the operation of the non-volatile memory device 150 is not changed. If any, the non-volatile memory device 150 may perform an erase operation for erasing the data stored in the cache buffer 1503 in the inside in response to the read preparation command or the read end command.

Also, it is described in the above embodiments that when the host controller 134 generates the read preparation command or the read end command and transfers the generated command to the non-volatile memory device 150, the non-volatile memory device 150 may then perform an erase operation for erasing the data stored in the cache buffer 1503 inside. However, it is possible to design the method into a form that the non-volatile memory device 150 may perform an erase operation of erasing the data stored in the cache buffer 1503 and the page buffer 1502 inside in response to the read preparation command or the read end command.

Also, the operation of the non-volatile memory device 150 is divided into the cache read operation and at least one other operation in the above embodiment of the present invention. Herein, the other operations may include a program operation or an erase operation of the non-volatile memory device 150. Of course, the other operations may include operations that is not the program operation or the erase operation of the non-volatile memory device 150 according to the kind or operation state of the non-volatile memory device 150.

Figure 8:
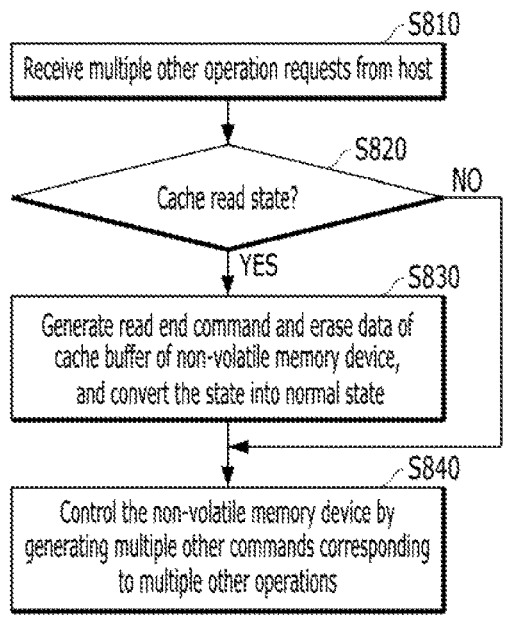
FIG. 8 is a flowchart illustrating an operation when at least one other operation is requested to be performed while a cache read operation is performed in a memory system in accordance with an embodiment of the present invention.

FIG. 8 is a flowchart illustrating an operation when at least one other operation is requested to be performed while a cache read operation is performed in the memory system 110 of FIG. 5 in accordance with the embodiment of the present invention.

For example, FIG. 8 describes a method how the host controller 134 included in the controller 130 inside the memory system 110 stops the cache read operation in the non-volatile memory device 150 and performs at least one other operation, when at least one other operation is requested to be performed.

First, when at least one other operation request is received from the host 102 in step S810, the host controller 134 may check out whether the non-volatile memory device 150 is in a cache read state or not in step S820 In other words, the host controller 134 may check out if a command that is transferred to the non-volatile memory device 150 right before the least one other command for performing some at least one other operation in the non-volatile memory device 150 in response to the least one other operation request received from the host 102 in the step S810 is a cache read command or a command for performing some at least one other operation.

If the non-volatile memory device 150 is not in a cache read state (NO in step S820), the host controller 134 may generate at least one other command corresponding to the at least one other operation request received from the host 102 in the step S810 and control the non-volatile memory device 150 to perform the at least one other operation in the non-volatile memory device 150 in step S840.

If the non-volatile memory device 150 is in a cache read state (YES in step S820), the host controller 134 may generate a read end command, erase the data stored in the cache buffer 1503 inside of the non-volatile memory device 150, and convert the state of the non-volatile memory device 150 into a normal state in step S830. In short, the host controller 134 may generate the read end command and transfer the generated read end command to the non-volatile memory device 150, before the host controller 134 transfers the at least one other command corresponding to the at least one other operation request received from the host 102 in the step S810 to the non-volatile memory device 150.

After the state of the non-volatile memory device 150 is changed into the normal state in the step S830, the host controller 134 may generate at least one other command that correspond to the at least one other operation request received from the host 102 in the step S810 and control the non-volatile memory device 150 to perform the at least one other operation.

When the non-volatile memory device 150 performs at least one other operation in response to the at least one other operation request received from the host 102 as described above and the non-volatile memory device 150 is in a cache read state, the state of the non-volatile memory device 150 is changed into the normal state based on the read end command.

Figure 9:
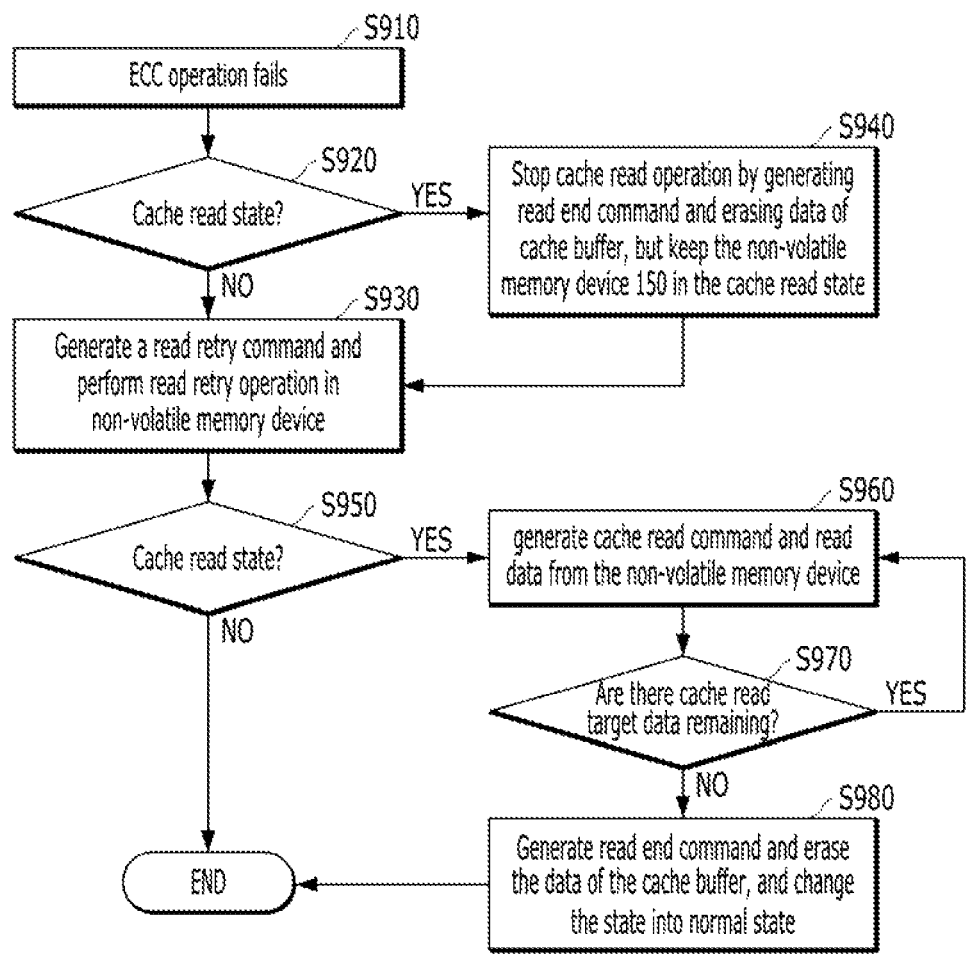
FIG. 9 is a flowchart illustrating an operation when a read retry operation is requested while a cache read operation is performed in a memory system, in accordance with the embodiment of the present invention.

FIG. 9 is a flowchart illustrating an operation when a read retry operation is requested while a cache read operation is performed in the memory system 110 of FIG. 5 in accordance with the embodiment of the present invention.

For example, FIG. 9 shows how the host controller 134 included in the controller 130 in the inside of the memory system 110 performs a read retry operation in the non-volatile memory device 150, when an error checking and correction (ECC) operation on the data that are read from the non-volatile memory device 150 fails and the read retry operation has to be performed.

First, it is determined in step S910 that the ECC operation on the data that are read from the non-volatile memory device 150 has failed.

Herein, the operation that is being performed by the non-volatile memory device 150 at a moment when the ECC operation on the data read from the non-volatile memory device 150 may be a cache read operation but it may also be at least one other operation due to the operation time of the operation of the ECC unit 138 included in the controller 130 inside the memory system 110. Therefore, the host controller 134 may check out whether the non-volatile memory device 150 is in the cache read operation or not in step S920 in response to the determination of the failure of the ECC operation in the step S910. In other words, the host controller 134 may check out whether the non-volatile memory device 150 is in the middle of performing the cache read operation or performing at least one other operation at a moment when the non-volatile memory device 150 generates a read retry command for performing a read retry operation in response to the determination of the failure of the ECC operation in the step S910.

When the non-volatile memory device 150 is not in the cache read state (NO in step S920), the host controller 134 may perform the read retry operation in the non-volatile memory device 150 by generating a read retry command in step S930.

When the non-volatile memory device 150 is in the cache read state (YES in step S920), the host controller 134 may stop the cache read operation by generating a read end command and thereby erasing the data stored in the cache buffer 1503 in the inside of the non-volatile memory device 150, but the host controller 134 may still maintain the non-volatile memory device 150 in the cache read state in step S940. In short, the host controller 134 may generate the read end command and transfer the generated read end command to the non-volatile memory device 150, before it transfers the read retry command, which is generated in response to the determination of the failure of the ECC operation in the step S910, to the non-volatile memory device 150. Subsequently, the host controller 134 may generate the read retry command and perform the read retry operation in the non-volatile memory device 150 in the step S930.

After the read retry operation is finished in the non-volatile memory device 150 in step S930, the host controller 134 may check out whether the non-volatile memory device 150 is in the cache read state or not in step S950. Herein, when it turns out that the operation that is being performed by the non-volatile memory device 150 at the moment when the ECC operation fails is the cache read operation, the non-volatile memory device 150 may maintain the cache read state continuously based on the operations of steps S920 and S940. Conversely, when it turns out that the operation that is being performed by the non-volatile memory device 150 at the moment when the ECC operation fails is at least one other operation, the state of the non-volatile memory device 150 may not be the cache read state.

When it turns out in the step S950 that the non-volatile memory device 150 is in the cache read state (YES), the host controller 134 may generate the cache read command corresponding to the cache read operation, which has been stopped in the step S940, and read the data from the non-volatile memory device 150 in step S960.

Subsequently, the host controller 134 may check out whether there are cache read target data remaining or not in step S970. In other words, the host controller 134 may check out whether there are data remaining to be cache-read in the step S970, following the data that are read according to the cache read operation that has been stopped.

When there are cache read target data remaining EYES in step S970), the host controller 134 may generate the cache read command for reading the cache read target data and read the data from the non-volatile memory device 150 in the step S960.

When there are no cache read target data remaining (NO in the step S970), the host controller 134 may generate the read end command and erase the data stored in the cache buffer 1503 in the inside of the non-volatile memory device 150 and change the state of the non-volatile memory device 150 into the normal state in step S980.

When the non-volatile memory device 150 is not in the cache read state (NO in step S950), there may be no predetermined operation.

As described above, when the ECC operation on the data that are read from the non-volatile memory device 150 fails and the read retry operation has to be performed while the non-volatile memory device 150 is in the cache read state, the host controller 134 may generate the read end command, erase the data stored in the cache buffer 1503 in the inside of the non-volatile memory device 150 so as to stop the cache read operation, and then perform the read retry operation.

Herein, FIG. 9 shows an embodiment where the host controller 134 is limited to performing the read retry operation in response to the determination of the failure in the ECC operation in the step S910. However, this is mere one embodiment of the present invention, and it is also possible to design the host controller 134 not to perform the read retry operation even though the failure in the ECC operation is confirmed in the step S910.

As described above with reference to FIGS. 7 to 9, it may be seen that the host controller 134 has to additionally generate the read preparation command and the read end command to apply the cache read operation to the non-volatile memory device 150, regardless of the read command or at least one other command that correspond to the request from the host 102. Such operations of the host controller 134 may be burden in consideration of the number of times that the read operation is performed.

To solve this problem, an embodiment of the present invention provides a method of minimizing the burden loaded on the operation of the host controller 134 by performing a portion of the operation that used to be performed by the host controller 134 in the memory controller 142 instead.

Figure 10:
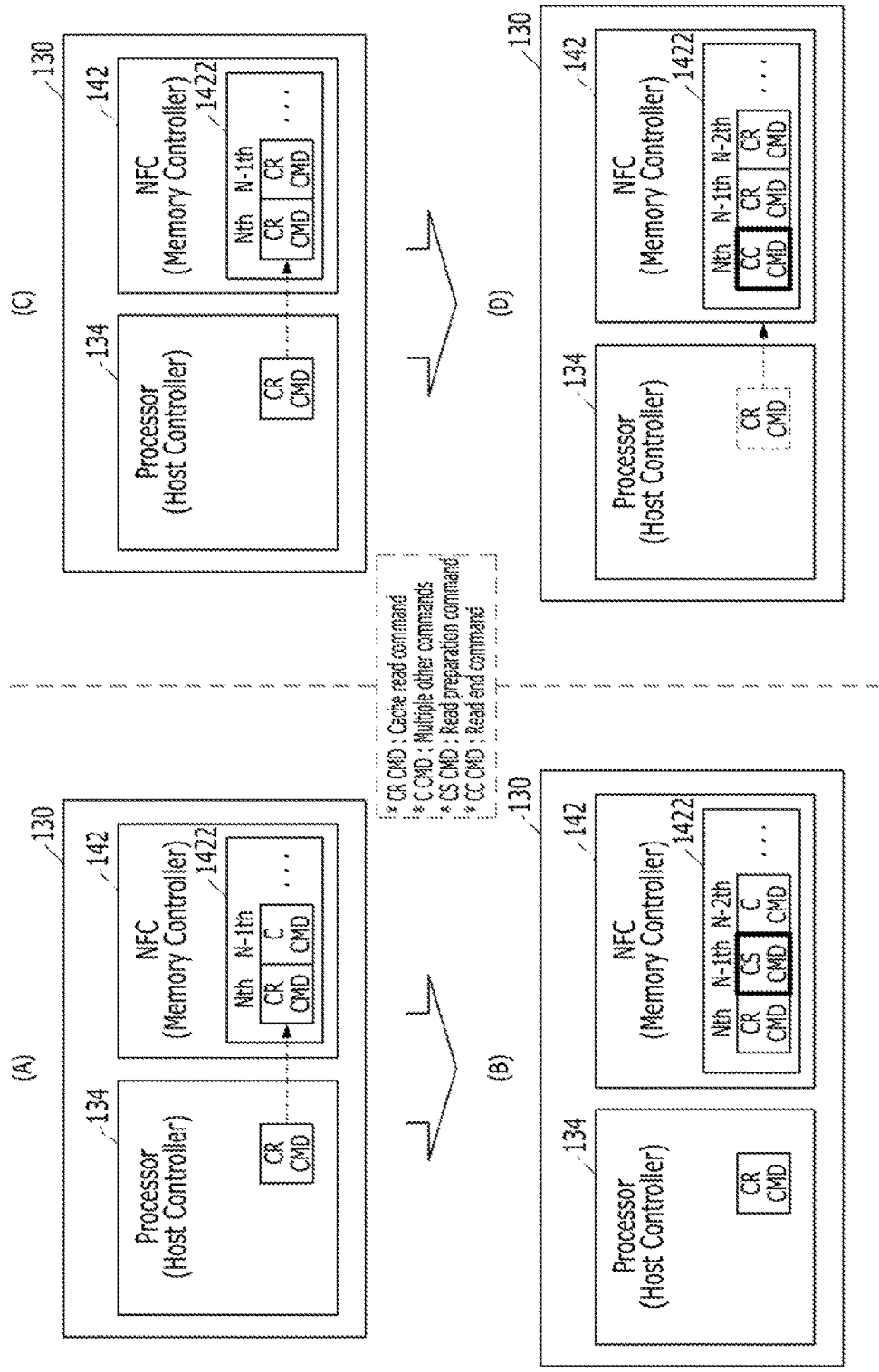
FIG. 10 is a diagram illustrating a cache read operation, in accordance with an embodiment of the present invention.

FIG. 10 is a diagram illustrating a cache read operation, in accordance with an embodiment of the present invention.

For example, FIG. 10 shows only the host controller 134 and the memory controller 142 among the constituent elements of the memory system 110 shown in FIG. 5. This is in order to illustrate that a portion of the operation performed by the host controller 134 may be performed by the memory controller 142, according to an embodiment of the present invention.

For example, the host controller 134 may generate the cache read command CR CMD for controlling a cache read operation of the non-volatile memory device 150 and at least one other command C CMD for controlling at least one other operation that is not a cache read operation in response to a request from the host 102. Herein, the at least one other command C CMD may include a program command for controlling a program operation of the non-volatile memory device 150 or an erase command for controlling an erase operation of the non-volatile memory device 150. Herein, the at least one other command C CMD may include other commands that are not the program command and the erase command according to the design of the memory system 110.

The memory controller 142 may control the operation of the non-volatile memory device 150 in response to the cache read command CR CMD and the at least one other command C CMD that are inputted from the host controller 134 (see A). Herein, the memory controller 142 may determine whether a command that is inputted right before the cache read command CR CMD from the host controller 134 is the at least one other command C CMD or not. When it turns out that the command that is inputted right before the cache read command CR CMD from the host controller 134 is the at least one other command C CMD, the memory controller 142 may add the read preparation command CS CMD between the at least one other command C CMD and the cache read command CR CMD (see B). Through the operation of adding the read preparation command CS CMD, the cache buffer 1503 of the non-volatile memory device 150 may be erased, and the state of the non-volatile memory device 150 may be changed into the cache read state. Also, when more than one cache read commands CR CMD are consecutively inputted from the host controller 134 and then the host controller 134 is informed that the cache read operation of the non-volatile memory device 150 is finished, the memory controller 142 may add a read end command CC CMD behind the last inputted cache read command CR CMD (see C and D). Through the operation of adding the read end command CC CMD, the cache buffer 1503 of the non-volatile memory device 150 may be erased and the state of the non-volatile memory device 150 may be changed into the normal state.

For example, the memory controller 142 may include the command queue 1422 for storing the maximal number of N commands, where N is an integer equal to or greater than 3. In this example, when the cache read command CR CMD is inputted from the host controller 134 and the memory controller 142 is informed that the command stored in the command queue 1422 right before the cache read command CR CMD is the at least one other command C CMD, the memory controller 142 may add the read preparation command CS CMD between the cache read command CR CMD and the at least one other command C CMD (see B). In this way, through the operation of adding the read preparation command CS CMD, the cache buffer 1503 of the non-volatile memory device 150 may be erased, and the state of the non-volatile memory device 150 may be changed into the cache read state. Also, when the cache read command CR CMD is inputted from the host controller 134 and stored in the command queue 1422 and the host controller 134 is informed that the cache read operation of the non-volatile memory device 150 is finished, the memory controller 142 may add the read end command CC CMD right behind the lastly stored cache read command CR CMD (see C and D). In this way, through the operation of adding the read end command CC CMD, the cache buffer 1503 of the non-volatile memory device 150 may be erased, and the state of the non-volatile memory device 150 may be changed into the normal state.

To be more specific, referring now to FIG. 10(A), the host controller 134 may generate the cache read command CR CMD in response to a request from the host 102. The generated cache read command CR CMD may be inputted in the last $N^{th}$ order into the command queue 1422 included in the memory controller 142. After the cache read command CR CMD generated in the host controller 134 is stored in the command queue 1422 of the memory controller 142, the memory controller 142 may check out whether the command inputted to the command queue 1422 in the $(N-1)^{th}$ order, which is right before the input of the newly inputted cache read command CR CMD, is the at least one other command C CMD or not.

It may be seen from the FIG. 10(A) that the command inputted to the command queue 1422 in the $(N-1)^{th}$ order, which is right before the cache read command CR CMD stored in the command queue 1422 in the last $N^{th}$ order, is the at least one other command C CMD. Therefore, the memory controller 142 may add the read preparation command CS CMD between the cache read command CR CMD and the at least one other command C CMD, as illustrated in a (B) of FIG. 10. Through the operation of adding the read preparation command CS CMD between the cache read command CR CMD and the at least one other command C CMD, the cache buffer 1503 of the non-volatile memory device 150 may be erased and the state of the non-volatile memory device 150 may be changed into the cache read state at the moment when the read preparation command CS CMD is transferred to the non-volatile memory device 150.

Herein, it may be seen that the at least one other command C CMD that are stored in the $(N-1)^{th}$ order in the (A) of FIG. 10 shifts into an $(N-2)^{th}$ order in the (B) of FIG. 10 where the read preparation command CS CMD is added. It may be seen from the shift that the operation of adding the read preparation command CS CMD in the memory controller 142 may be performed when there is at least one empty storage space in the command queue 1422.

For example, referring to a (C) of FIG. 10, the host controller 134 may generate the cache read command CR CMD in response to a request from the host 102. The generated cache read command CR CMD may be inputted in the last $N^{th}$ order into the command queue 1422 included in the memory controller 142. After the cache read command CR CMD generated in the host controller 134 is stored in the command queue 1422 of the memory controller 142, the memory controller 142 may check out whether the command inputted to the command queue 1422 in the $(N-1)^{th}$ order, which is right before the input of the newly inputted cache read command CR CMD, is the at least one other command C CMD or not.

It may be seen from the (C) of FIG. 10 that the command inputted to the command queue 1422 in the $(N-1)^{th}$ order, which is right before the cache read command CR CMD stored in the command queue 1422 in the last $N^{th}$ order, is the cache read command CR CMD. Therefore, the memory controller 142 may not add any command between the cache read command CR CMD and the cache read command CR CMD, as illustrated in FIG. 10(D).

Meanwhile, it may be seen from FIG. 10(D) that, after the cache read command CR CMD generated in FIG. 10(C) is inputted to the command queue 1422, the host controller 134 may be informed that the cache read operation of the non-volatile memory device 150 is finished and then transfer the information (CR END) to the memory controller 142. Therefore, the memory controller 142 may add the read end command CC CMD right after the cache read command CR CMD that is stored in the command queue 1422 in the last order, which is illustrated in FIG. 10(D). Through the process of adding the read end command CC CMD right after the cache read command CR CMD that is stored lastly in the command queue 1422, it is possible to erase the cache buffer 1503 of the non-volatile memory device 150 and change the state of the non-volatile memory device 150 into the normal state at the moment when the read end command CC CMD is transferred to the non-volatile memory device 150. Herein, it may be seen from the FIG. 10(C) that the cache read commands CR CMD stored in the $N^{th}$ order and the $(N-1)^{h}$ order may shift into the $(N-1)^{th}$ order and the $(N-2)^{th}$ order, respectively, in FIG. 10(D) where the read end command CC CMD is added. It may be seen from the shift that the operation of adding the read end command CC CMD in the memory controller 142 may be performed when there is at least one empty storage space in the command queue 1422.

Referring to FIGS. 7 and 10 together, the operation performed by the host controller 134 in the cache read operation in accordance with AN embodiment of the present invention described by referring to FIG. 7, which is the operation of generating the read preparation command CS CMD and adding the generated read preparation command CS CMD between the cache read command CR CMD and the at least one other command C CMD, is performed by the memory controller 142 in the embodiment of the present invention shown in FIG. 10. Also in the cache read operation in accordance with the embodiment of the present invention described by referring to FIG. 7, the operation performed by the host controller 134, which is the operation of generating the read end command CC CMD and adding the generated read end command CC CMD behind the lastly inputted cache read command CR CMD is performed by the memory controller 142, too, in the embodiment of the present invention shown in FIG. 10.

To sum up, the operations of the steps S720, S730, and S760 in the flowchart of FIG. 7 performed by the host controller 134, they are performed by the memory controller 142 in the embodiment of FIG. 10.

As described above, since a portion (S720, S730, and S760) of the operation shown in FIG. 7, which used to be performed by the host controller 134, is controlled to be performed by the memory controller 142 in the feature operation of the present invention, the burden on the operation of the host controller 134 may be alleviated remarkably.

Meanwhile, in the cache read operation shown in FIG. 7, the host controller 134 decides whether the non-volatile memory device 150 is in the cache read state or in the normal state in order to detect the operation state of the non-volatile memory device 150. However, in the embodiment of the present invention shown in FIG. 10 to which the feature operation of the present invention is added, since a portion (S720, S730, and S760) of the operation of the host controller 134 is performed by the memory controller 142, the memory controller 142 decides whether the non-volatile memory device 150 is in the cache read state or in the normal state in order to detect the operation state of the non-volatile memory device 150. Of course, as described with reference to FIG. 7, the setting value inside the memory controller 142 may differ according to whether the non-volatile memory device 150 is in the cache read state or in the normal state in the embodiment of the present invention shoe in FIG. 10, too, and there is no change in the operation of the non-volatile memory device 150. If any, the non-volatile memory device 150 may perform an operation of erasing the data stored in the cache buffer 1503 inside in response to the read preparation command or the read end command.

It is described in the above embodiment that when the memory controller 142 generates the read preparation command CS CMD or the read end command CC CMD and transfers the generated command to the non-volatile memory device 150, the non-volatile memory device 150 may perform an operation of erasing the data stored in the cache buffer 1503 inside. However, the non-volatile memory device 150 may also be designed to perform an operation of erasing the data stored in the cache buffer 1503 and the page buffer 1502 inside in response to the read preparation command CS CMD or the read end command CC CMD.

Figure 11:
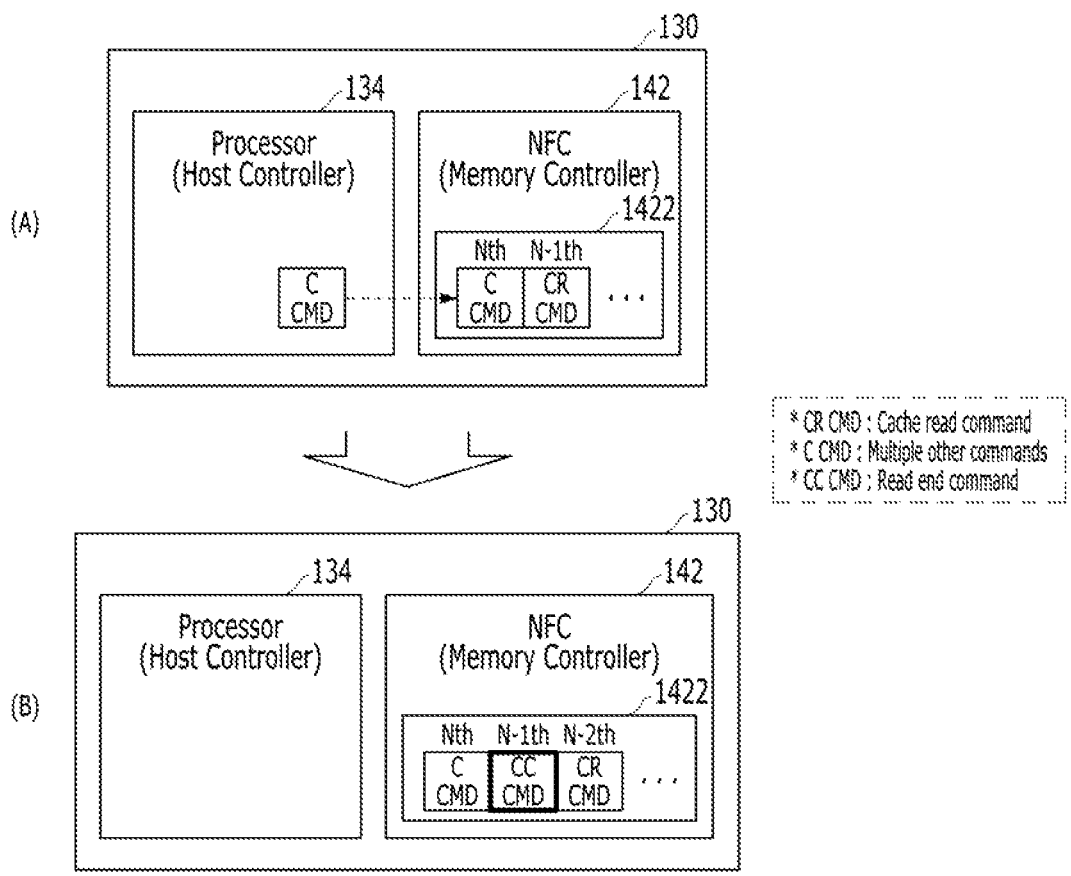
FIG. 11 is a diagram illustrating a case where at least one other operation is requested to be performed while a cache read operation is performed in the memory system, in accordance with the embodiment of the present invention.

FIG. 11 is a diagram illustrating a case where at least one other operation is requested to be performed while a cache read operation is performed in the memory system 110, in accordance with the embodiment of the present invention.

For example, FIG. 11 shows only the host controller 134 and the memory controller 142 among the constituent elements included in the memory system 110 of FIG. 5. This is for emphasizing that the feature of the embodiments of the present invention described herein with reference to FIG. 11 is that a portion of the operation performed by the host controller 134 is performed by the memory controller 142.

For example, the host controller 134 may generate the cache read command CR CMD for controlling a cache read operation of the non-volatile memory device 150 and at least one other command C CMD, which is also referred to as at least one other command C CMD herein, for controlling at least one other operation that is not a cache read operation in response to a request from the host 102. Herein, the at least one other command C CMD may include a program command for controlling a program operation of the non-volatile memory device 150 and an erase command for controlling an erase operation of the non-volatile memory device 150. Herein, the at least one other command C CMD may include other commands that is not the program command and the erase command according to the design of the memory system 110.

The memory controller 142 may control the operation of the non-volatile memory device 150 in response to the cache read command CR CMD and the at least one other command C CMD that are inputted from the host controller 134 (see A). Herein, the memory controller 142 may determine whether a command that is inputted right before the at least one other command C CMD from the host controller 134 is the cache read command CR CMD or not. When it turns out that the command that is inputted right before the at least one other command C CMD from the host controller 134 is the cache read command CR CMD, the memory controller 142 may add the read end command CC CMD between the cache read command CR CMD and the at least one other command C CMD (see B). Through the operation of adding the read end command CC CMD, the cache buffer 1503 of the non-volatile memory device 150 may be erased, and the state of the non-volatile memory device 150 may be changed into the normal state.

In other words, the memory controller 142 may include the command queue 1422 for storing the maximal number of N commands, where N is an integer equal to or greater than 3. Accordingly, when the at least one other command C CMD are inputted from the host controller 134 and the memory controller 142 is informed that the command that is stored in the command queue 1422 right before the at least one other command C CMD is the cache read command CR CMD, the memory controller 142 may add the read end command CC CMD between the at least one other command C CMD and the cache read command CR CMD (see B). In this way, through the operation of adding the read end command CC CMD, the cache buffer 1503 of the non-volatile memory device 150 may be erased, and the state of the non-volatile memory device 150 may be changed into the normal state.

To be more specific, to have a look at a (A) of FIG. 11, the host controller 134 may generate the at least one other command C CMD in response to a request from the host 102. The generated at least one other command C CMD may be inputted in the last $N^{th}$ order into the command queue 1422 included in the memory controller 142. After the at least one other command C CMD generated in the host controller 134 are stored in the command queue 1422 of the memory controller 142, the memory controller 142 may check out whether the command inputted to the command queue 1422 in the $(N-1)^{th}$ order, which is right before the input of newly inputted at least one other command C CMD, is the cache read command CR CMD or not.

It may be seen from the (A) of FIG. 11 that the command inputted to the command queue 1422 in the $(N-1)^{th}$ order, which is right before the at least one other command C CMD stored in the command queue 1422 in the last $N^{th}$ order, is the cache read command CR CMD. Therefore, the memory controller 142 may add the read end command CC CMD between the at least one other command C CMD and the cache read command CR CMD, as illustrated in a (B) of FIG. 11. Through the operation of adding the read end command CC CMD between the at least one other command C CMD and the cache read command CR CMD, the cache buffer 1503 of the non-volatile memory device 150 may be erased and the state of the non-volatile memory device 150 may be changed into the normal state at the moment when the read end command CC CMD is transferred to the non-volatile memory device 150. Herein, it may be seen that the cache read command CR CMD that are stored in the $(N-1)^{th}$ order in the (A) of FIG. 11 shifts into an $(N-2)^{th}$ order in the (B) of FIG. 11 where the read end command CC CMD is added. It may be seen from the shift that the operation of adding the read end command CC CMD in the memory controller 142 may be performed when there is at least one empty storage space in the command queue 1422.

Referring to FIGS. 8 and 11 together, the operation performed by the host controller 134 in the cache read operation in accordance with the embodiment of the present invention described by referring to FIG. 8, which is the operation of generating the read end command CC CMD and adding the generated read end command CC CMD between the at least one other command C CMD and the cache read command CR CMD, is performed by the memory controller 142 in the embodiment of the present invention shown in FIG. 11.

In other words, the operations of the steps S820 and S830 in the flowchart of FIG. 8 used to be performed by the host controller 134, but they are performed by the memory controller 142 the embodiment of the present invention shown in FIG. 11.

Since a portion (S820 and S830) of the operation shown in FIG. 8, which used to be performed by the host controller 134, is controlled to be performed by the memory controller 142 in the feature operation of the present invention, the burden on the operation of the host controller 134 may be alleviated remarkably.

Meanwhile, in the cache read operation shown in FIG. 8 the host controller 134 decides whether the non-volatile memory device 150 is in the cache read state or in the normal state in order to detect the operation state of the non-volatile memory device 150. However, in the embodiment of the present invention shown in FIG. 11 to which the feature operation of the present invention is added, since a portion (S820 and S830) of the operation of the host controller 134 is performed by the memory controller 142, the memory controller 142 decides whether the non-volatile memory device 150 is in the cache read state or in the normal state in order to detect the operation state of the non-volatile memory device 150. Of course, as described with reference to FIG. 8, the setting value in the inside of the memory controller 142 may become different according to whether the non-volatile memory device 150 is in the cache read state or in the normal state in the embodiment of the present invention shown in FIG. 11, too, and there is no change in the operation of the non-volatile memory device 150. If any, the non-volatile memory device 150 may perform an operation of erasing the data stored in the cache buffer 1503 inside in response to the read end command.

It is described in the above embodiment that when the memory controller 142 generates the read end command CC CMD and transfers the generated read end command CC CMD to the non-volatile memory device 150, the non-volatile memory device 150 may perform an operation of erasing the data stored in the cache buffer 1503 inside. However, the non-volatile memory device 150 may also be designed to perform an operation of erasing the data stored in the cache buffer 1503 and the page buffer 1502 inside in response to the read end command CC CMD.

Figure 12:
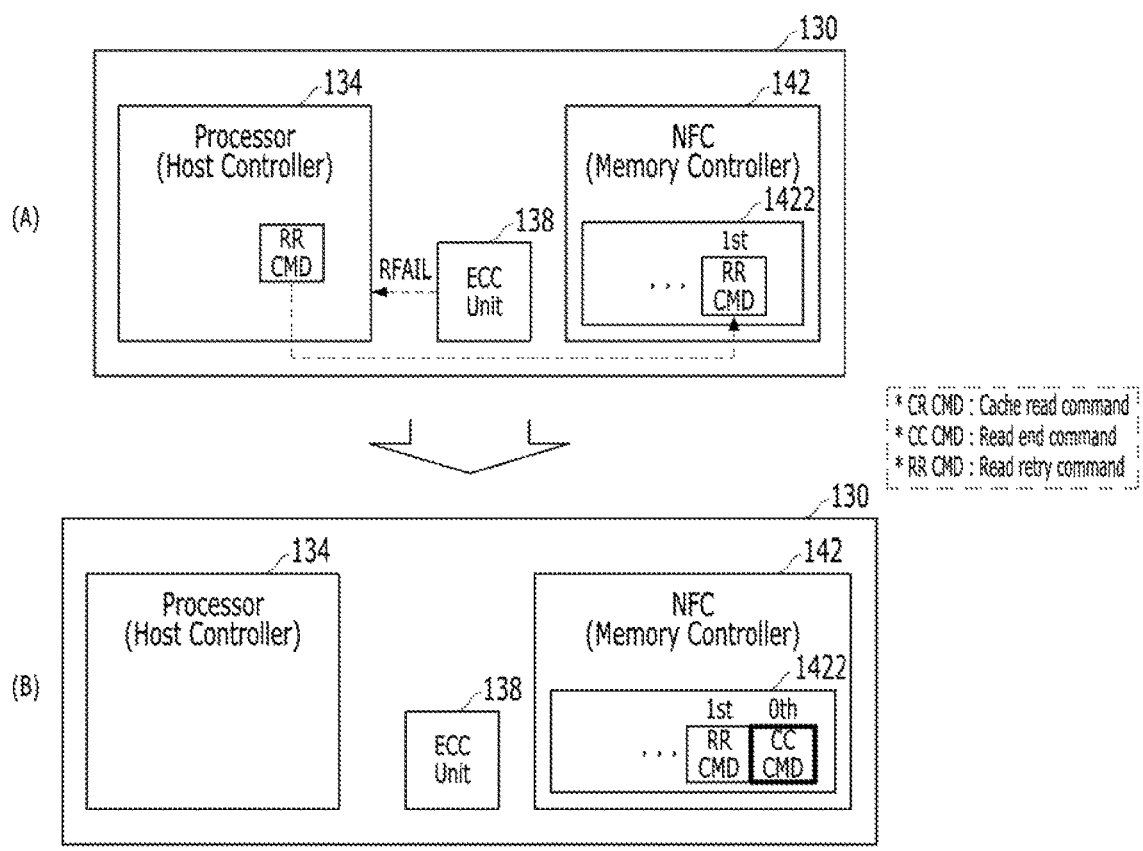
FIG. 12 is a diagram illustrating a case where a read retry operation is requested to be performed while a cache read operation is performed in the memory system, in accordance with the embodiment of the present invention.

FIG. 12 a diagram illustrating a case where a read retry operation is requested to be performed while a cache read operation is performed in the memory system 110 in accordance with the embodiment of the present invention.

For example, FIG. 12 shows only the host controller 134 and the memory controller 142 among the constituent elements included in the memory system 110 of FIG. 5. This is for emphasizing that the feature of the embodiments of the present invention to described herein with reference to FIG. 12 is that, when an error checking and correction (ECC) operation of the ECC unit 138 fails and a read retry operation has to be performed, a portion of the operation performed by the host controller 134 is performed by the memory controller 142.

Herein, the ECC unit 138 may detect whether there is an error in the data that are read from the non-volatile memory device 150 and performs an error correction operation on the detected error, which is described earlier with reference to FIG. 1. Since there is a limit in the error bits that may be corrected by the ECC unit 138, when the error correction operation on the data that are read from the non-volatile memory device 150 fails, the ECC unit 138 may generate a read failure signal RFAIL and transfer the generated read failure signal RFAIL to the host controller 134.

Upon receipt of the read failure signal RFAIL transferred from the ECC unit 138, the host controller 134 may generate a read retry command RR CMD for controlling a read retry operation of the non-volatile memory device 150.

The memory controller 142 then may control the read retry operation of the non-volatile memory device 150 in response to the read retry command RR CMD, which is inputted from the host controller 134. Herein, the memory controller 142 may check out whether the non-volatile memory device 150 is performing a cache read operation or at least one other operation at a moment when the read retry command RR CMD is inputted from the host controller 134. When the non-volatile memory device 150 is in a cache read state, the memory controller 142 may add a read end command CC CMD right before the read retry command RR CMD.

In other words, the memory controller 142 may include the command queue 1422 for storing the maximal number of N commands, where N is an integer equal to or greater than 3. Accordingly, when the read retry command RR CMD is inputted from the host controller 134, the memory controller 142 may store the inputted read retry command RR CMD in the foremost order (i.e., the first or top of the list) of the command queue 1422. This is for emphasizing that the read retry command RR CMD is a command with the highest priority. At a moment when the read retry command RR CMD is stored in the command queue 1422, the memory controller 142 may check out whether the non-volatile memory device 150 is in the cache read state or in the normal state. When the non-volatile memory device 150 is in the cache read state, the memory controller 142 may add the read end command CC CMD right before the read retry command RR CMD. In this way, through the operation of adding the read end command CC CMD, the cache buffer 1503 of the non-volatile memory device 150 may be erased, and the state of the non-volatile memory device 150 may be maintained in the cache read state continuously.

For example, referring to FIG. 12(A), the read failure signal RFAIL may be generated in the ECC unit 138 and transferred to the host controller 134, and then the host controller 134 may generate the read retry command RR CMD based on the received read failure signal RFAIL. The generated read retry command RR CMD may be inputted in the foremost order (which is the first order) of the command queue 1422 included in the memory controller 142. At a moment when the read retry command RR CMD generated in the host controller 134 is stored in the command queue 1422 of the memory controller 142, the memory controller 142 may check out whether the non-volatile memory device 150 is in the cache read state or in the normal state. Herein, since whether the non-volatile memory device 150 is in the cache read state or in the normal state is set up according to how the memory controller 142 is set, the state of the non-volatile memory device 150 may be detected instantly in the inside of the memory controller 142.

FIG. 12(B) shows a case where the non-volatile memory device 150 turns out to be in the cache read state in FIG. 12(A). As shown in FIG. 12(B), the memory controller 142 may add the read end command CC CMD right before the read retry command RR CMD. Through the operation of adding the read end command CC CMD right before the read retry command RR CMD, the cache buffer 1503 of the non-volatile memory device 150 may be erased at the moment when the read end command CC CMD is transferred to the non-volatile memory device 150, and the non-volatile memory device 150 is maintained in the cache read state continuously.

Herein, the read retry command RR CMD is stored in the first order in both of FIG. 12(A) and FIG. 12(B), and the read end command CC CMD, which is not shown in FIG. 12(A), is added in the 0$^{th}$ order in the FIG. 12(B). This merely shows that the read end command CC CMD that is added by the memory controller 142 to control the read retry operation is transferred to the non-volatile memory device 150 before the read retry command RR CMD. The read end command CC CMD that is added for controlling the read retry operation may be designed to be substantially stored in the command queue 1422 and then transferred to the non-volatile memory device 150, or it may be designed to be transferred to the non-volatile memory device 150 without passing through the command queue 1422.

Referring now to both FIGS. 9 and 12, in a cache read operation in accordance with an embodiment of the present invention described by referring to FIG. 9, the operation that is performed by the host controller 134, which is the operation of generating the read end command CC CMD and adding the generated read end command CC CMD right before the read retry command RR CMD, is performed by the memory controller 142 in the embodiment of the present invention shown in FIG. 12.

For example, the operations of the steps S920 and S940 in the flowchart of FIG. 9 which were performed by the host controller 134, they are performed by the memory controller 142 in the embodiment of the present invention of FIG. 12.

As described above, since a portion (S920 and S940) of the operation shown in FIG. 9, which used to be performed by the host controller 134, is controlled to be performed by the memory controller 142 in the feature operation of the present invention, the burden on the operation of the host controller 134 may be alleviated remarkably.

Meanwhile, in the cache reed operation shown in FIG. 9, the host controller 134 decides whether the non-volatile memory device 150 is in the cache read state or in the normal state in order to detect the operation state of the non-volatile memory device 150. However, in the embodiment of the present invention shown in FIG. 12, since a portion (S920 and S940) of the operation of the host controller 134 is performed by the memory controller 142, the memory controller 142 decides whether the non-volatile memory device 150 is in the cache read state or in the normal state in order to detect the operation state of the non-volatile memory device 150. Of course, as described with reference to FIG. 9, the setting value inside of the memory controller 142 may become different according to whether the non-volatile memory device 150 is in the cache read state or in the normal state in the embodiment of the present invention shown in FIG. 12, too, and there is no change in the operation of the non-volatile memory device 150. If any, the non-volatile memory device 150 may perform an operation of erasing the data stored in the cache buffer 1503 inside in response to the read end command.

It is described in the previous embodiment of the present invention that when the memory controller 142 generates the read end command CC CMD and transfers the generated read end command CC CMD to the non-volatile memory device 150, the non-volatile memory device 150 performs the operation of erasing the data that are stored in the cache buffer 1503 inside. However, it is also possible to design the non-volatile memory device 150 to perform the operation of erasing the data stored in the cache buffer 1503 and the page buffer 1502 in response to the read end command CC CMD.

Hereafter, data processing system and electronic devices including the memory system 110 in accordance with the embodiments of the present invention, which is described above by referring to FIGS. 1 to 12, are described in detail with reference to FIGS. 13 to 18.

Figure 13:
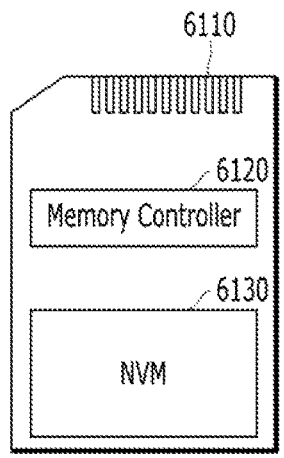
FIGS. 13 to 18 are diagrams illustrating various examples of memory systems, according to embodiments of the present invention.

FIG. 13 is a diagram illustrating a data processing system including the memory system according to an embodiment. For example, FIG. 13 illustrates a memory card system 6100 to which the memory system according to an embodiment is applied.

Referring to FIG. 13, the memory card system 6100 may include a memory controller 6120, a memory device 6130, and a connector 6110.

The memory controller 6120 may be connected with the memory device 6130 and may access the memory device 6130. In some embodiments, the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1) through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCI-e), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS), wireless-fidelity (WI-FI) and Bluetooth. Accordingly, the memory system and the data processing system according to the embodiment may be applied to wired/wireless electronic appliances, for example, a mobile electronic appliance.

The memory device 6130 may be implemented with a nonvolatile memory (NVM). For example, the memory device 6130 may be implemented with one of various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM) and a spin torque transfer magnetic RAM (STT-MRAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (e.g., Personal Computer Memory Card International Association (PCM-CIA)), a compact flash card (CF), a smart media card (e.g., SM and SMC), a memory stick, a multimedia card (e.g. MMC, RS-MMC, MMCmicro and eMMC), an SD card (e.g., SD, miniSD, microSD and SDHC) and a universal flash storage (UFS).

Figure 14:
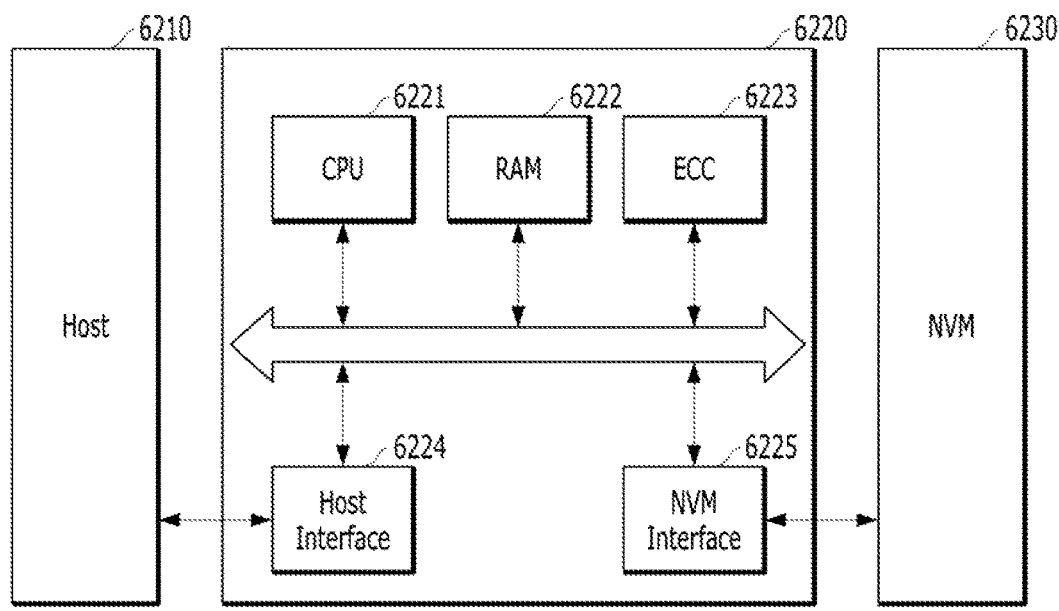

FIG. 14 is a diagram schematically illustrating another example of a data processing system 6200 including a memory system according to an embodiment of the present invention.

Referring to FIG. 14, the data processing system 6200 may include a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include at least one of a central processing unit (CPU) 6221, a random access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221 and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory the RAM 6222 is used to buffer data to be transmitted from the host 6210 to the memory device 6230 or from the memory device 6230 to the host 6210. In the case where the RAM 6222 is used as a cache memory, the RAM 6222 may be used to enable the memory device 6230 with a low speed to operate at a high speed.

The ECC circuit 6223 may correspond to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using one of various coded modulations such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM) and a Block coded modulation (BCM).

The memory controller 6220 may transmit and receive data to and from the host 6210 through the host interface 6224, and transmit and receive data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is implemented, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances, for example, a mobile electronic appliance.

Figure 15:
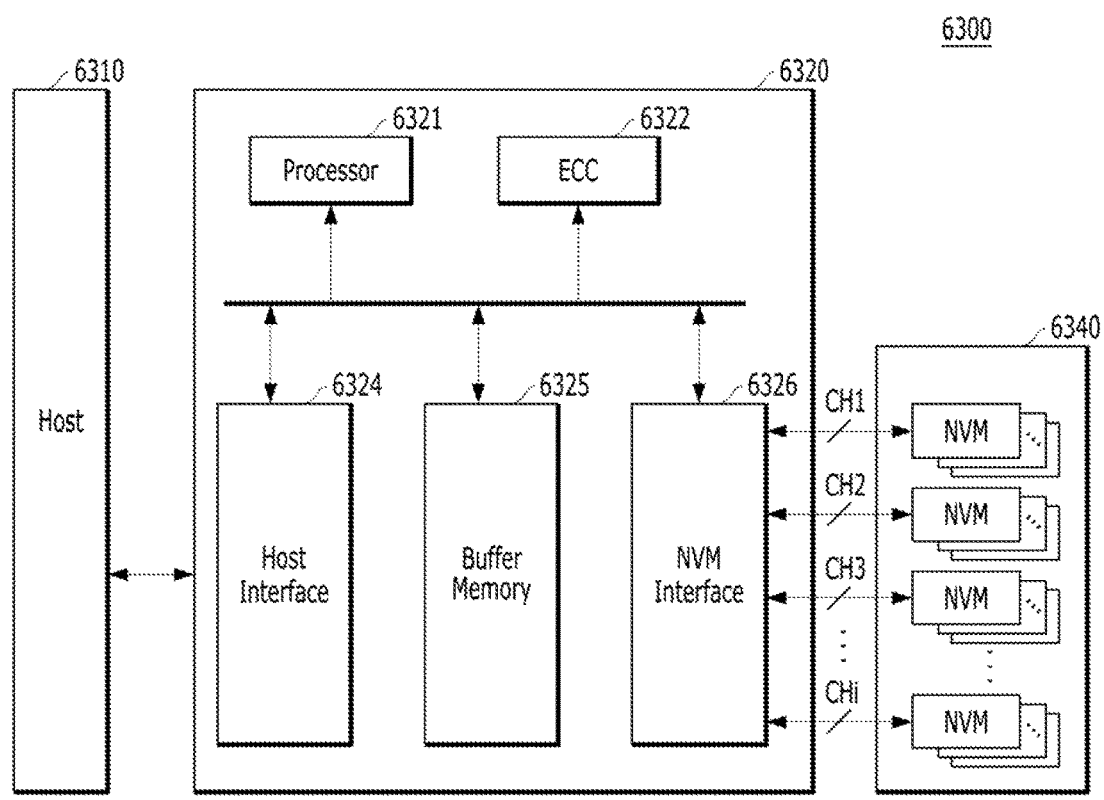

FIG. 15 is a diagram illustrating another example of a data processing system including a memory system according to an embodiment of the invention. For example, in FIG. 15, a solid state drive (SSD) 6300 employing a memory system is shown, according to an embodiment of the present invention.

Referring to FIG. 15, the SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

In detail, the controller 6320 may be connected with the memory device 6340 through a plurality of channels CH1, CH2, CH3, . . . and CHi. The controller 6320 may include a processor 6321, a buffer memory 6325, an error correction code (ECC) circuit 6322, a host interface 6324, and a nonvolatile memory (NVM) interface as a memory interface 6326 coupled via an internal bus.

The buffer memory 6325 may temporarily store data received from a host 6310 or data received from a plurality of nonvolatile memories NVMs included in the memory device 6340, or temporarily store metadata of the plurality of nonvolatile memories NVMs. For example, the metadata may include map data including mapping tables. The buffer memory 6325 may be implemented with a volatile memory such as, but not limited to, a dynamic random access memory (DRAM), a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 15, for the sake of convenience in explanation, that the buffer memory 6325 is disposed inside the controller 6320, it is to be noted that the buffer memory 6325 may be disposed outside the controller 6320.

The ECC circuit 6322 may calculate error correction code values of data to be programmed in the memory device 6340 in a program operation, perform an error correction operation for data read from the memory device 6340, based on the error correction code values, in a read operation, and perform an error correction operation for data recovered from the memory device 6340 in a recovery operation for failed data.

The host interface 6324 may provide an interface function with respect to an external device such as the host 6310. The nonvolatile memory interface 6326 may provide an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system such as a redundant array of independent disks (RAID) system may be implemented. In the RAID system, the plurality of SSDs 6300 and an RAID controller for controlling the plurality of SSDs 6300 may be included. In the case of performing a program operation by receiving a write command from the host 6310, the RAID controller may select at least one memory system (for example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (for example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 16:
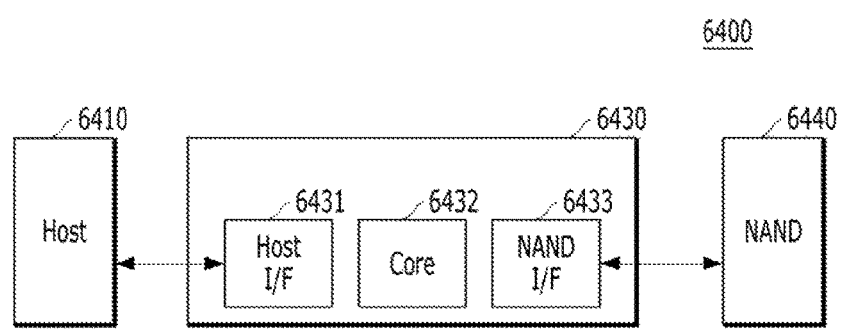

FIG. 16 is a diagram illustrating another example of a data processing system including the memory system according to an embodiment of the present invention. For example, in FIG. 16, an embedded multimedia card (eMMC) 6400 employing a memory system is shown.

Referring to FIG. 16, the eMMC 6400 may include a memory device 6440 which is implemented with at least one NAND flash memory, and a controller 6430. The controller 6430 may correspond to the controller 130 in the memory system 110 described above with reference to FIG. 1, and the memory device 6440 may correspond to the memory device 150 in the memory system 110 described above with reference to FIG. 1.

The controller 6430 may be connected with the memory device 6440 through a plurality of channels. The controller 6430 may include a core 6432, a host interface 6431, and a memory interface such as a NAND interface 6433.

The core 6432 may control the operations of the eMMC 6400. The host interface 6431 may provide an interface function between the controller 6430 and a host 6410. The NAND interface 6433 may provide an interface function between the memory device 6440 and the controller 6430. For example, the host interface 6431 may be a parallel interface such as an MMC interface, as described above with reference to FIG. 1, or a serial interface such as an ultra-high speed class 1 (UHS-I)/UHS class 2 (UHS-II) and a universal flash storage (UFS) interface.

Figure 17:
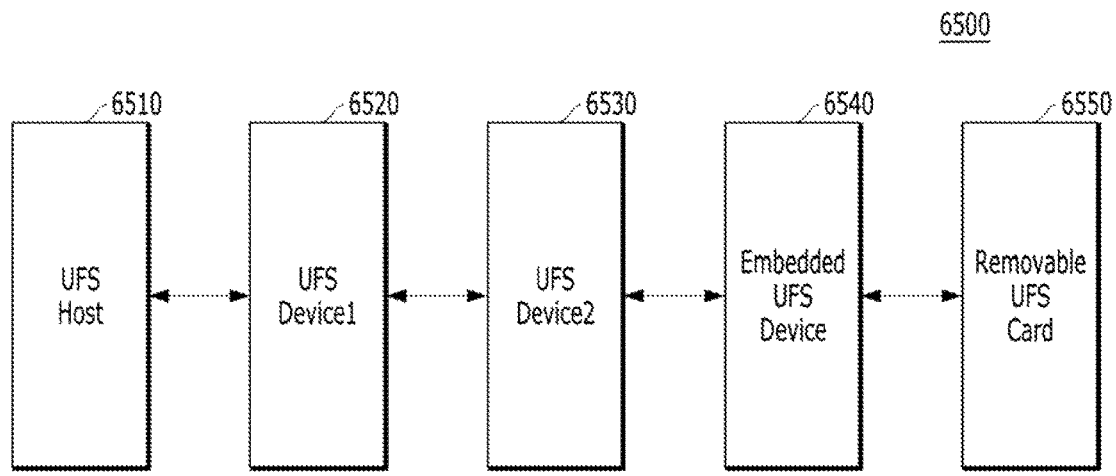

FIG. 17 is a diagram illustrating another example of a data processing system including a memory system according to an embodiment of the present invention. For example, in FIG. 17, a universal flash storage (UFS) 6500 employing the memory system is shown.

Referring to FIG. 17, the UFS system 6500 may include a UFS host 6510, a plurality of UFS devices 6520 and 6530, an embedded UFS device 6540 and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 13. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 18:
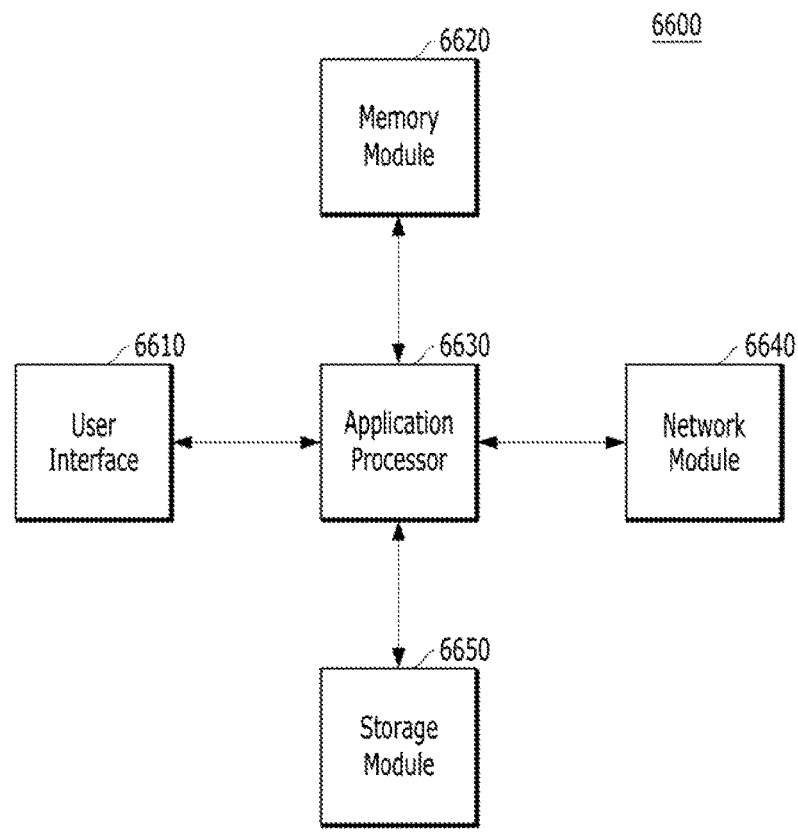

FIG. 18 is a diagram illustrating another example of a data processing system including the memory system according to an embodiment of the present invention. For example, in FIG. 18, a user system 6600 employing the memory system is shown.

Referring to FIG. 18, the user system 6600 may include a user interface 6610, a memory module 6620, an application processor 6630, a network module 6640, and a storage module 6650.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600, The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA), global system for mobile communication (GSM) wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), and so on, and may thereby communicate with wired/wireless electronic appliances, for example, a mobile electronic appliance. Accordingly, the memory system and the data processing system according to the embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be implemented by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example the storage module 6650 may correspond to the memory system 110 described above with reference to FIG. 1, and may be implemented with the SSD, eMMC and UFS described above with reference to FIGS. 15 to 17.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

According to the embodiments of the present invention, auxiliary commands for informing a non-volatile memory device of the beginning and end of a sequential read operation not between a sequential read operation and another sequential read operation but between a plurality of different operations are managed not in a Flash Translation Layer (FTL) but in a NAND Flash Controller (NFC).

Therefore, it is possible to minimize the generation of overhead in the operation of the flash translation layer. In this way, the sequential read operation may be performed efficiently.

While the present invention has been described with respect to specific embodiments, it will be apparent to those skilled in the art to which the present invention pertains that various changes and modifications may be made without departing from the spirit and scope of the invention as defined in the following claims.

What is claimed is:

1. A memory system, comprising:
   a non-volatile memory device;
   a host controller suitable for generating a cache read command for controlling a cache read operation of the non-volatile memory device and at least one other command for controlling at least one other operation of the non-volatile memory device excluding the cache read operation in response to a request received from a host; and
   a memory controller suitable for controlling an operation of the non-volatile memory device in response to the cache read command and the at least one other command that are inputted from the host controller,
   wherein the memory controller checks out a following command after the cache read command is inputted and adds a read end command when the following command is the at least one other command, and
   wherein the memory controller checks out another following command after the at least one other command is inputted and adds a read preparation command when said another following command is the cache read command.

2. The memory system of claim 1, wherein
   when one or more cache read commands are consecutively inputted and then the at least one other command is inputted, the memory controller adds the read end command between the consecutively inputted cache read commands and the at least one other command, and
   when one or more cache read commands are consecutively inputted and then the host controller is informed that the cache read operation of the non-volatile memory device is finished, the memory controller adds the read end command right behind a lastly inputted cache read command, and
   when at least one other command is inputted consecutively and then the cache read command is inputted, the memory controller adds the read preparation command between the at least one other command that are inputted consecutively and the cache read command.

3. The memory system of claim 1, wherein the memory controller includes:
   a command queue suitable for storing a maximal number of N commands (where N is an integer equal to or greater than 3), and
   when the at least one other command is inputted to the command queue from the host controller and a command stored in the command queue right before the at least one other command is the cache read command, the memory controller adds the read end command between the at least one other command and the cache read command, and
   when the cache read command is inputted from the host controller and stored in the command queue and then the host controller is informed that the cache read operation of the non-volatile memory device is finished, the memory controller adds the read end command right behind the cache read command that is stored last in the command queue, and when the cache read command is inputted from the host controller to the command queue and a command stored in the command queue right before the cache read command is the at least one other command, the memory controller adds the read preparation command between the cache read command and the at least one other command.

4. The memory system of claim 1, further comprising:
an Error Checking and Correction (ECC) unit suitable for checking out whether the cache read operation is succeeded or not,
wherein the host controller selectively generates a read retry command for controlling a read retry operation of the non-volatile memory device in response to an output signal of the ECC unit.

5. The memory system of claim 4, wherein the memory controller controls the read retry operation of the non-volatile memory device in response to the read retry command that is inputted from the host controller by checking out whether the non-volatile memory device is performing the cache read command or not at a moment when the read retry command is inputted and selectively adding the read end command right before the read retry command.

6. The memory system of claim 5, wherein the memory controller includes:
a command queue suitable for storing a maximal number of N commands (where N is an integer equal to or greater than 3), and
when the read retry command is inputted from the host controller to the command queue and the non-volatile memory device is performing the cache read operation, the memory controller adds the read end command right before the read retry command.

7. The memory system of claim 1, wherein the non-volatile memory device includes:
a non-volatile memory cell region;
a page buffer suitable for storing data inputted to/outputted from the non-volatile memory cell region; and
a cache buffer that is coupled to the page buffer and transfers/receives data to/from the page buffer, and stores data inputted to/outputted from the memory controller.

8. The memory system of claim 7, wherein the non-volatile memory device erases data that are stored in the cache buffer in response to the read preparation command or the read end command transferred from the memory controller.

9. The memory system of claim 7, wherein the non-volatile memory device erases data that are stored in the page buffer and the cache buffer in response to the read preparation command or the read end command transferred from the memory controller.

10. The memory system of claim 1, wherein the at least one other operation includes one of a program operation of the non-volatile memory device and an erase operation of the non-volatile memory device.

11. A method for operating a memory system including a non-volatile memory device, comprising:
generating, by a host controller, a cache read command for controlling a cache read operation of the non-volatile memory device and at least one other command for controlling at least one other operation of the non-volatile memory device excluding the cache read operation in response to a request received from a host; and
at least one other command controlling, by a memory controller, an operation of the non-volatile memory device in response to receiving of the cache read command and the at least one other command,
wherein the controlling of the operation of the non-volatile memory device includes: checking out a following command after the cache read command is inputted and adding a read end command when the following command is the at least one other command; and
checking out another following command after the at least one other command is inputted and adding a read preparation command when said another following command is the cache read command.

12. The method of claim 11, wherein at least one other command controlling of the operation of the non-volatile memory device includes:
when one or more cache read commands are consecutively inputted and then the at least one other command is inputted, adding the read end command between the consecutively inputted cache read commands and the at least one other command;
when one or more cache read commands are consecutively inputted and then the host controller is informed that the cache read operation of the non-volatile memory device is finished, at least one other operation adding the read end command right behind a lastly inputted cache read command; and
when at least one other command is inputted consecutively and then the cache read command is inputted, adding the read preparation command between the at least one other command that are inputted consecutively and the cache read command.

13. The method of claim 11, further comprising:
storing the commands, which are generated in the generating of the cache read command for controlling the cache read operation of the non-volatile memory device and the at least one other command for controlling the at least one other operation that is not the cache read operation in response to the request received from the host, in a command queue capable of storing a maximal number of N commands (where N is an integer equal to or greater than 3) in a predetermined sequential order,
wherein the controlling of the operation of the non-volatile memory device includes:
when the at least one other command is inputted to the command queue and a command stored in the command queue right before the at least one other command is the cache read command, adding the read end command between the at least one other command and the cache read command;
when the cache read command is stored in the command queue and then an end of the cache read operation of the non-volatile memory device is confirmed, adding the read end command right behind the cache read command that is stored last in the command queue; and
when the cache read command is inputted to the command queue and a command stored in the command queue right before the cache read command is the at least one other command, adding the read preparation command between the cache read command and the at least one other command.

14. The method of claim 11, further comprising:

checking out whether the cache read operation of the non-volatile memory device is succeeded or not so as to produce a checking result, wherein the generating of the cache read command and the other command includes generating a read retry command for controlling a read retry operation of the non-volatile memory device in response to the checking result.

15. The method of claim 14, further comprising:

receiving the read retry command and controlling the read retry operation of the non-volatile memory device by checking out whether the non-volatile memory device is performing the cache read command or not at a moment when the read retry command is inputted and selectively adding the read end command right before the read retry command.

16. The method of claim 15, further comprising:

sequentially storing the commands, which are generated in the generating of the cache read command for controlling the cache read operation of the non-volatile memory device and the at least one other command for controlling the at least one other operation that is not the cache read operation in response to the request received from the host, in a command queue capable of storing a maximal number of N commands (where N is an integer equal to or greater than 3) in a predetermined sequential order, wherein in the receiving of the read retry command and the controlling of the read retry operation of the non-volatile memory device by checking out whether the non-volatile memory device is performing the cache read command or not at a moment when the read retry command is inputted and selectively adding the read end command right before the read retry command, when the read retry command is inputted to the command queue and the non-volatile memory device is performing the cache read operation, the read end command is added right before the read retry command.

17. The method of claim 11, wherein the non-volatile memory device includes:

a non-volatile memory cell region;

a page buffer suitable for storing data inputted to/outputted from the non-volatile memory cell region; and a cache buffer that is coupled to the page buffer and transfers/receives data to/from the page buffer, and stores data inputted to/outputted from an exterior of the non-volatile memory device, and further comprising:

erasing the data stored in the cache buffer of the non-volatile memory device in response to the read preparation command or the read end command.

18. The method of claim 11, wherein the non-volatile memory device includes:

a non-volatile memory cell region;

a page buffer suitable for storing data inputted to/outputted from the non-volatile memory cell region; and a cache buffer that is coupled to the page buffer and transfers/receives data to/from the page buffer, and stores data inputted to/outputted from an exterior of the non-volatile memory device, and further comprising:

erasing the data stored in the page buffer and the cache buffer of the non-volatile memory device in response to the read preparation command or the read end command.

19. The method of claim 11, wherein the at least one other operation includes one of a program operation of the non-volatile memory device and an erase operation of the non-volatile memory device.

* * * * *